US012078966B2

(12) United States Patent
Hasegawa et al.

(10) Patent No.: US 12,078,966 B2
(45) Date of Patent: Sep. 3, 2024

(54) DIAL, MODULE, ELECTRONIC DEVICE AND TIMEPIECE

(71) Applicant: Casio Computer Co., Ltd., Tokyo (JP)

(72) Inventors: Kenji Hasegawa, Fussa (JP); Yosaku Ishii, Akishima (JP)

(73) Assignee: Casio Computer Co., Ltd., Tokyo (JP)

(*) Notice: Subject to any disclaimer, the term of this patent is extended or adjusted under 35 U.S.C. 154(b) by 1007 days.

(21) Appl. No.: 16/928,568

(22) Filed: Jul. 14, 2020

(65) Prior Publication Data

US 2021/0026306 A1 Jan. 28, 2021

(30) Foreign Application Priority Data

| | | | |
|---|---|---|---|
| Jul. 25, 2019 | (JP) | ................................ | 2019-136575 |
| Jul. 25, 2019 | (JP) | ................................ | 2019-136576 |
| Dec. 19, 2019 | (JP) | ................................ | 2019-229446 |
| Dec. 19, 2019 | (JP) | ................................ | 2019-229449 |

(51) Int. Cl.

| | |
|---|---|
| ***G04B 19/14*** | (2006.01) |
| ***G04B 19/06*** | (2006.01) |
| ***G04C 3/00*** | (2006.01) |

(52) U.S. Cl.

CPC .......... *G04B 19/14* (2013.01); *G04B 19/065* (2013.01); *G04C 3/005* (2013.01)

(58) Field of Classification Search

CPC ....... G04B 19/14; G04B 19/06; G04B 19/065

See application file for complete search history.

(56) References Cited

U.S. PATENT DOCUMENTS

| | | | | |
|---|---|---|---|---|
| 5,699,324 A | | 12/1997 | Perrot et al. | |
| 5,966,344 A | * | 10/1999 | Umemoto .............. | G04B 19/12 368/227 |
| 6,275,450 B1 | | 8/2001 | Makiba | |
| 7,551,522 B2 | * | 6/2009 | Gruosi .................. | G04B 45/02 368/220 |
| 8,556,500 B2 | | 10/2013 | Hiranuma | |
| 9,886,004 B2 | * | 2/2018 | Altenhoven ......... | G04B 37/055 |
| 10,824,115 B2 | | 11/2020 | Kawata | |
| 2012/0120778 A1 | | 5/2012 | Hiranuma | |

(Continued)

FOREIGN PATENT DOCUMENTS

| | | |
|---|---|---|
| CN | 1246932 A | 3/2000 |
| CN | 108398875 A | 8/2018 |

(Continued)

OTHER PUBLICATIONS

Notice of Reasons for Refusal, dated Sep. 22, 2021, for Japanese Application No. 2019-229446, 8 pages. (with English Translation).

(Continued)

*Primary Examiner* — Edwin A. Leon

*Assistant Examiner* — Jason M Collins

(74) *Attorney, Agent, or Firm* — Seed IP Law Group LLP

(57) ABSTRACT

A dial including a projection piece projecting in a radial direction and a pin projecting from the projection piece. In addition, an electronic device including a case having a switch provided on an outer circumferential surface, and a dial arranged in the case, in which the dial includes a projection piece that projects from an outer circumferential surface opposing the switch and comes in contact with an inner circumferential surface of the case.

17 Claims, 15 Drawing Sheets

(56) References Cited

U.S. PATENT DOCUMENTS

| | | | | |
|---|---|---|---|---|
| 2013/0148484 | A1* | 6/2013 | Jeanrenaud | G04B 19/12 368/232 |
| 2014/0016446 | A1* | 1/2014 | Correa | G04B 19/14 368/232 |
| 2018/0173163 | A1* | 6/2018 | Kraehenbuehl | G04B 19/12 |
| 2018/0224805 | A1* | 8/2018 | Kawata | G04C 10/02 |
| 2018/0259910 | A1* | 9/2018 | Iguchi | G04D 1/10 |
| 2019/0086871 | A1 | 3/2019 | Okamura et al. | |
| 2019/0391533 | A1* | 12/2019 | Barfuss | G04D 3/0002 |
| 2020/0301363 | A1* | 9/2020 | Fiammingo | G04B 19/06 |

FOREIGN PATENT DOCUMENTS

| | | | |
|---|---|---|---|
| CN | 108572540 | A | 9/2018 |
| JP | S5547632 | U | 3/1980 |
| JP | S57-048478 | U | 3/1982 |
| JP | H04130092 | U | 11/1992 |
| JP | H05-014972 | U | 2/1993 |
| JP | H06-022983 | U | 3/1994 |
| JP | H0862346 | A | 3/1996 |
| JP | H08304563 | A | 11/1996 |
| JP | 9-61550 | A | 3/1997 |
| JP | 2005-265783 | A | 9/2005 |
| JP | 2010-243429 | A | 10/2010 |
| JP | 2012-107998 | A | 6/2012 |
| JP | 2014-002100 | A | 1/2014 |
| JP | 5482224 | B2 | 5/2014 |
| JP | 2017-181081 | A | 10/2017 |
| JP | 2018-119807 | A | 8/2018 |
| JP | 2019-052967 | A | 4/2019 |

OTHER PUBLICATIONS

Chinese Office Action, mailed Jan. 4, 2022, for Chinese Application No. 202010700955.3, 22 pages. (with English Translation).

Chinese Office Action, dated Jun. 1, 2021, for Chinese Application No. 202010700955.3, 18 pages. (with English Translation).

Notice of Reasons for Refusal, dispatched Jun. 16, 2021, for Japanese Application. No. 2019-229446, 9 pages. (with English Translation).

Notice of Reasons for Refusal, dispatched Jun. 16, 2021, for Japanese Application. No. 2019-229449, 10 pages. (with English Translation).

Japanese Notice of Reasons for Refusal dated Jan. 16, 2024, for the corresponding Japanese Patent Application No. 2021-206214, 10 pages. (With English Translation).

Japanese Notice of Reasons for Refusal dated May 28, 2024, for the corresponding Japanese Patent Application No. 2021-206214, 10 pages. (With English Translation).

* cited by examiner

DIAL, MODULE, ELECTRONIC DEVICE AND TIMEPIECE

CROSS-REFERENCE TO RELATED APPLICATIONS

This application is based upon and claims the benefit of priority from the prior Japanese Patent Applications No. 2019-136575 filed Jul. 25, 2019, No. 2019-136576 filed Jul. 25, 2019, No. 2019-229446 filed Dec. 19, 2019, and No. 2019-229449, filed Dec. 19, 2019, the entire contents of which are incorporated herein by reference.

BACKGROUND

1. Technical Field

The technical field relates to a dial that is used for wristwatches and measuring instruments such as meters, a module, an electronic device and a timepiece.

2. Description of the Related Art

For example, a wristwatch is known which has a structure where a dial is attached to a movement that is a module body by a plurality of pins on the movement being pressed and inserted into a plurality of attachment holes on the dial, as described in Japanese Patent Application Laid-Open (Kokai) Publication No. 2010-243429.

Also, for example, a timepiece is known which has a structure where a dial is positioned on a timepiece frame that is a timepiece case by a positioning tongue-shaped piece projecting from an outer circumferential portion of the dial being held in a positioning hole provided in an inner circumferential portion of the timepiece frame, as described in Japanese Utility-Model Application Laid-Open (Kokai) Publication No. 06-022983.

SUMMARY

In accordance with one embodiment, there is provided a dial comprising: a projection piece projecting in a radial direction; and a pin projecting from the projection piece.

In accordance with another embodiment, there is provided an electronic device comprising: a case having a switch provided on an outer circumferential surface; and a dial arranged in the case, wherein the dial comprises a projection piece that projects from an outer circumferential surface opposing the switch and comes in contact with an inner circumferential surface of the case.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment related to a wristwatch will hereinafter be described with reference to FIG. 1 to FIG. 13B.

Figure 1:
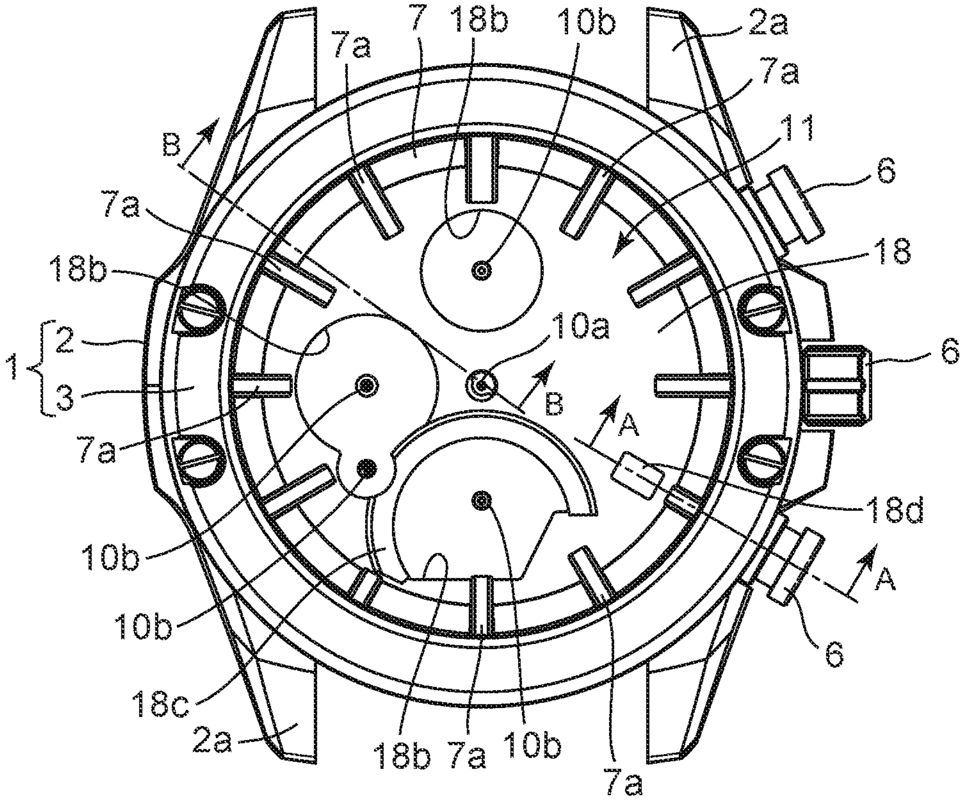
FIG. 1 is an enlarged front view of an embodiment related to a wrist watch.
Figure 2:
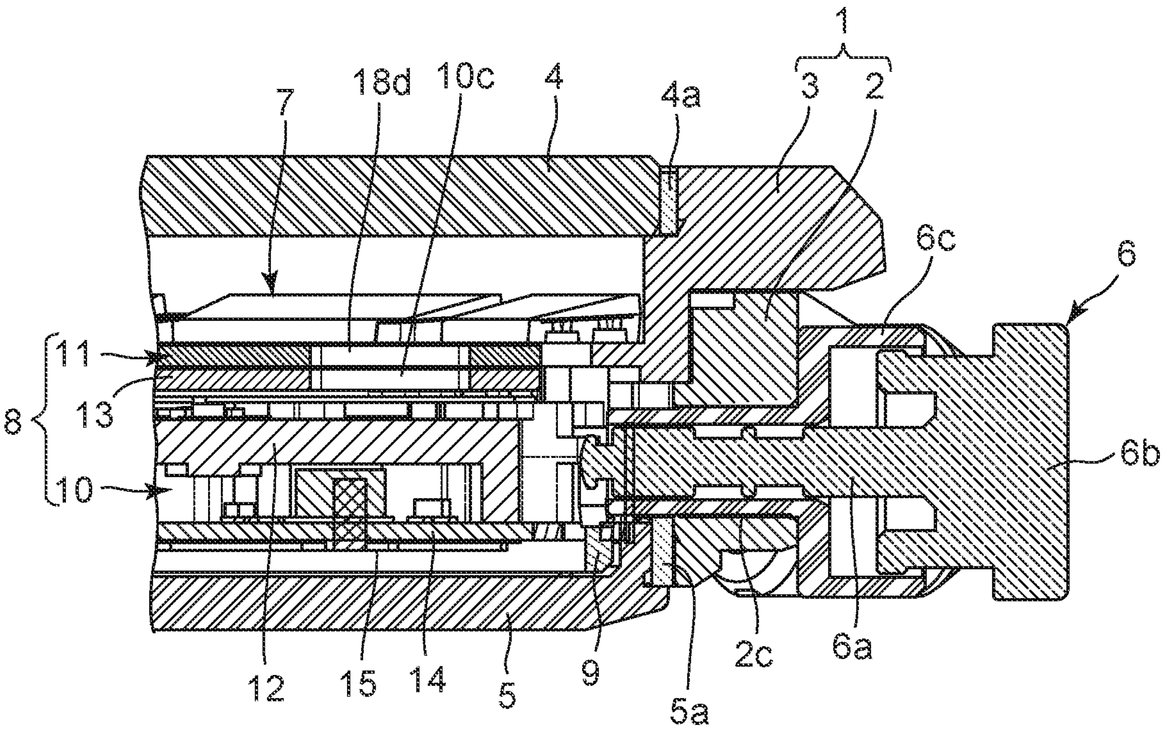
FIG. 2 is an enlarged cross-sectional view of a main portion of the wristwatch taken along line A-A in FIG. 1.
Figure 3:
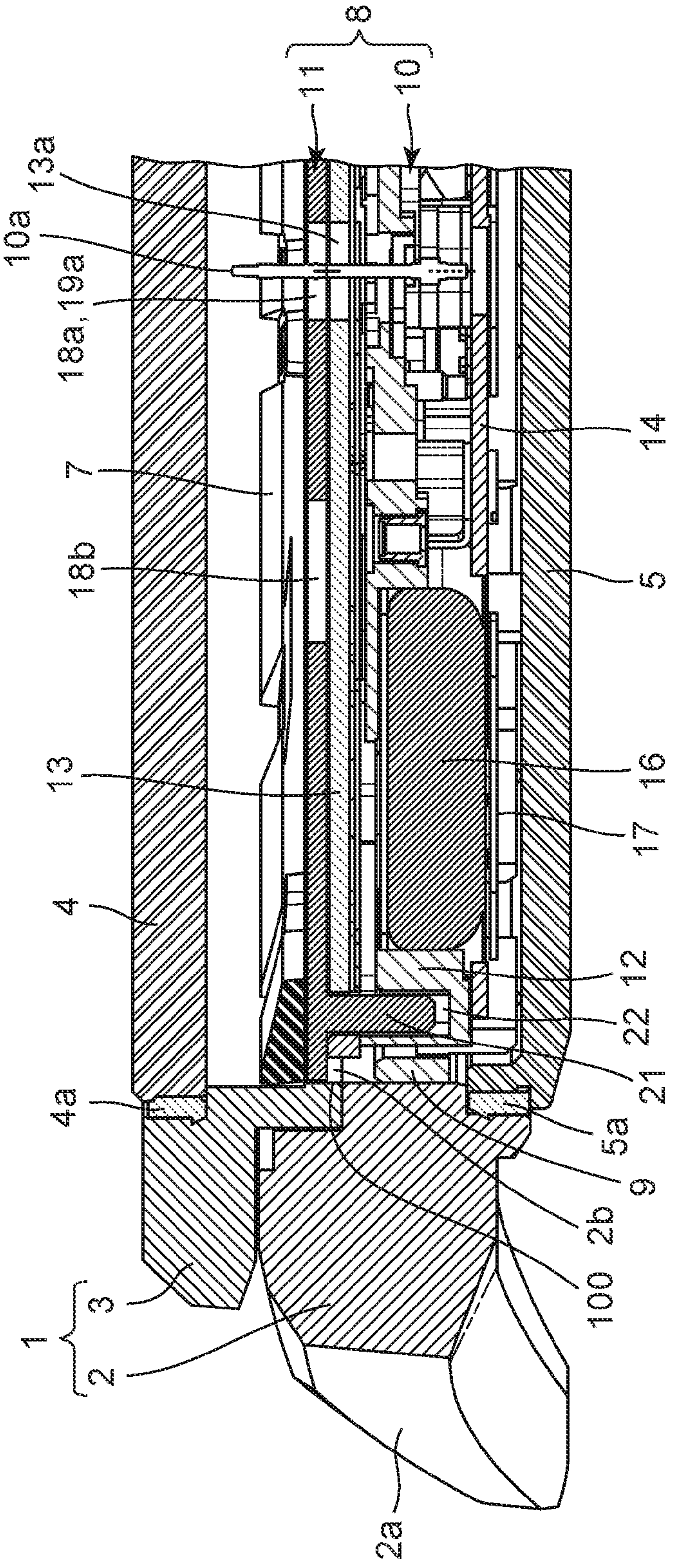
FIG. 3 is an enlarged cross-sectional view of the main portion of the wristwatch taken along line B-B in FIG. 1.
Figure 4A:
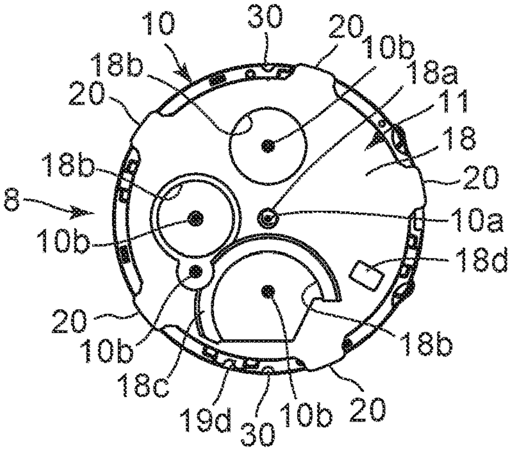
FIG. 4A is an enlarged front view of a timepiece module shown in FIG. 2.
Figure 4B:
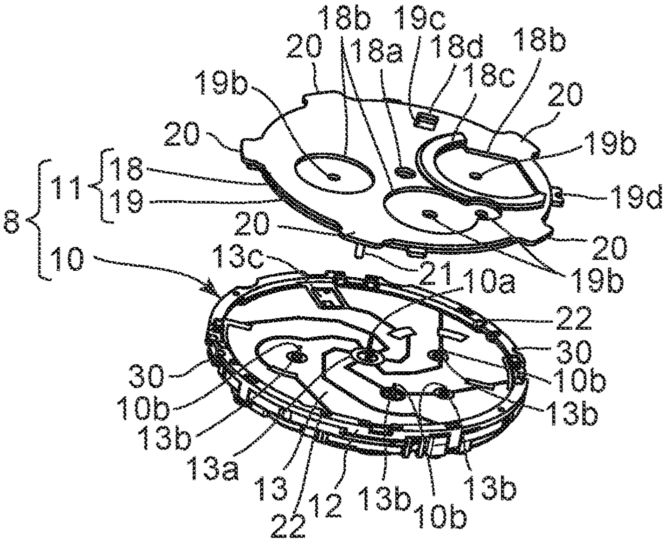
FIG. 4B is an enlarged perspective view of the timepiece module of FIG. 2 disassembled into a dial and a module body when viewed from diagonally above.
Figure 4C:
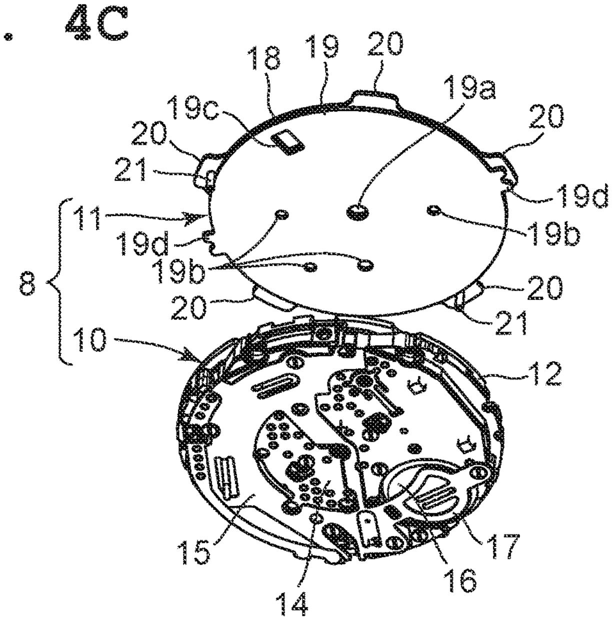
FIG. 4C is an enlarged perspective view of the timepiece module of FIG. 2 disassembled into the dial and the module body when viewed from diagonally below.
Figure 5A:
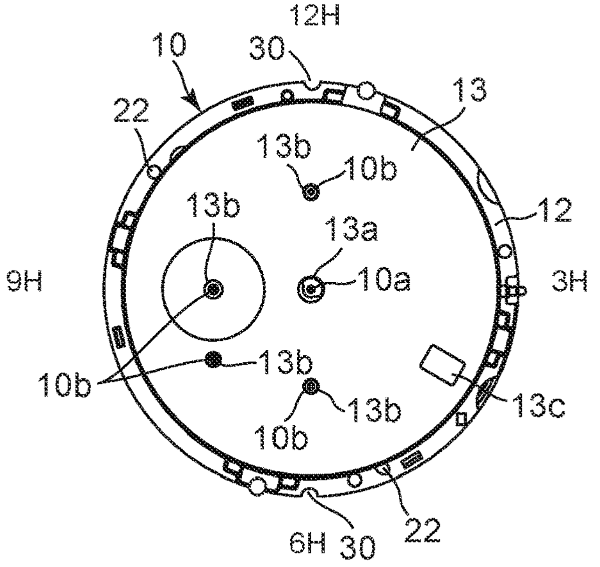
FIG. 5A is an enlarged front view of the module body shown in FIG. 4A, FIG. 4B and FIG. 4C.
Figure 5B:
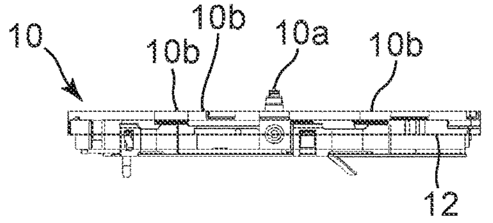
FIG. 5B is an enlarged side view of the module body shown in FIG. 4A, FIG. 4B and FIG. 4C.
Figure 5C:
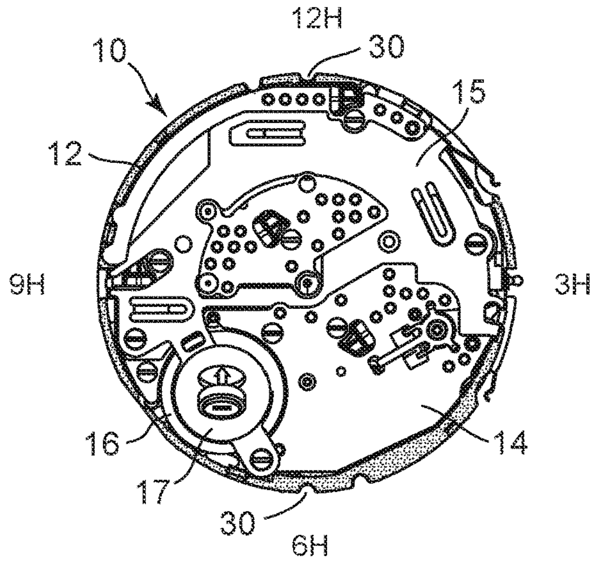
FIG. 5C is an enlarged back view of the module body shown in FIG. 4A, FIG. 4B and FIG. 4C.
Figure 6A:
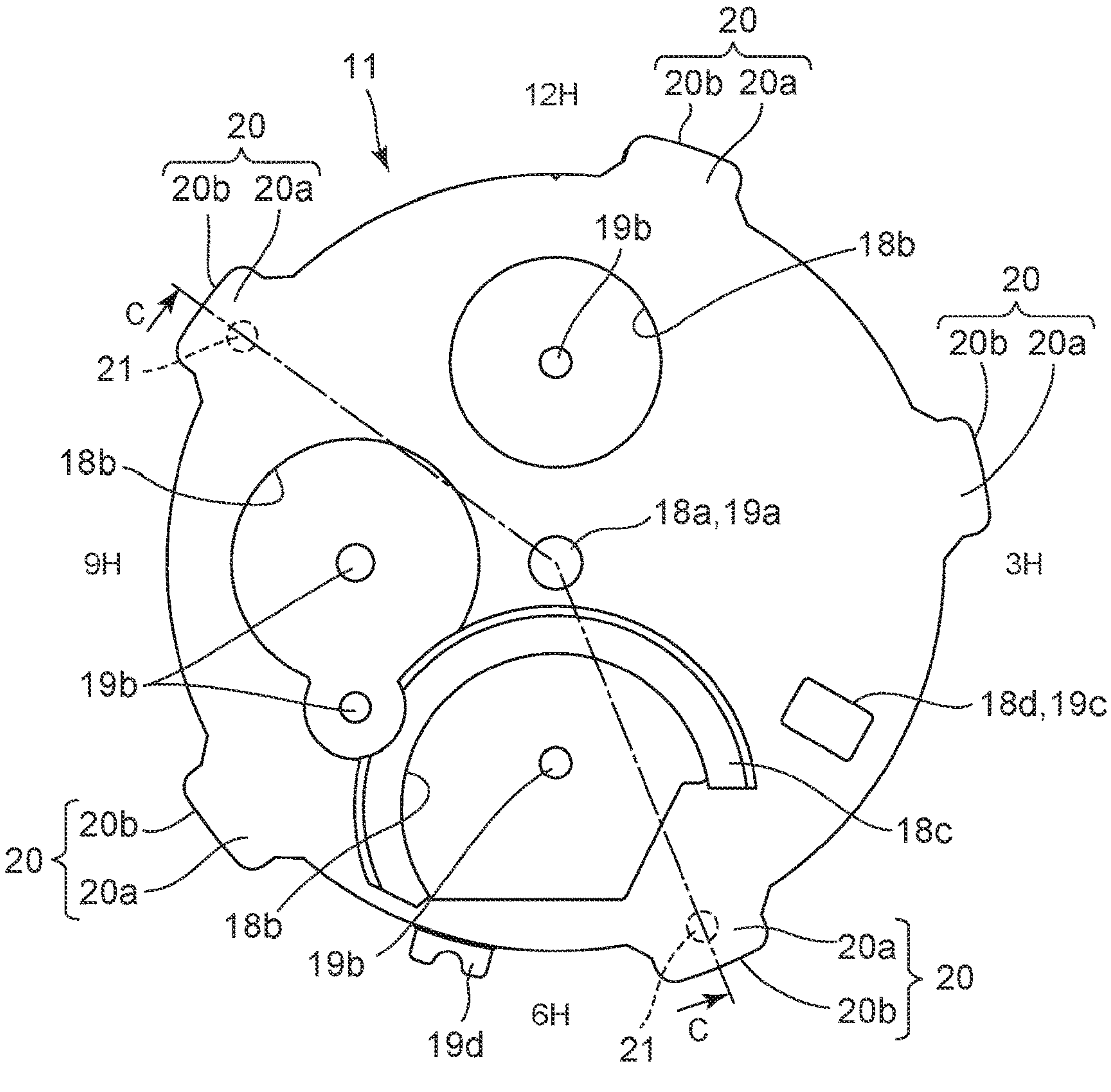
FIG. 6A is an enlarged front view of the dial shown in FIG. 4A, FIG. 4B and FIG. 4C.
Figure 6B:
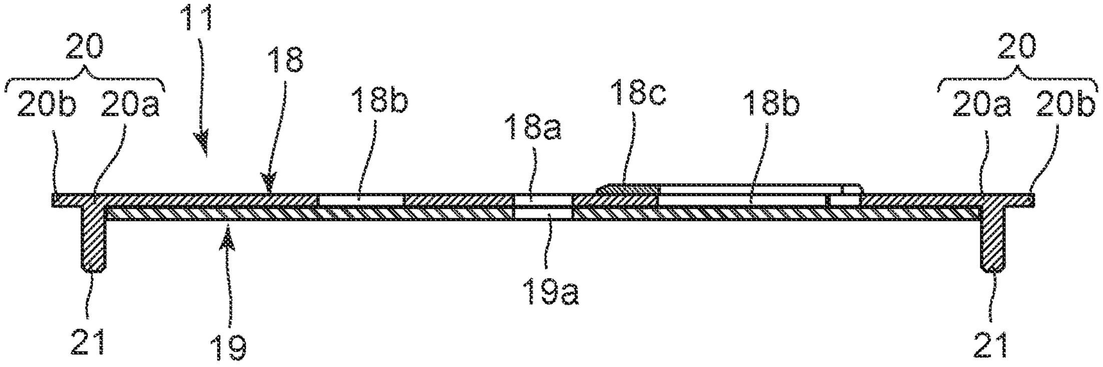
FIG. 6B is an enlarged cross-sectional view of the dial taken along line C-C in FIG. 6A.
Figure 7:
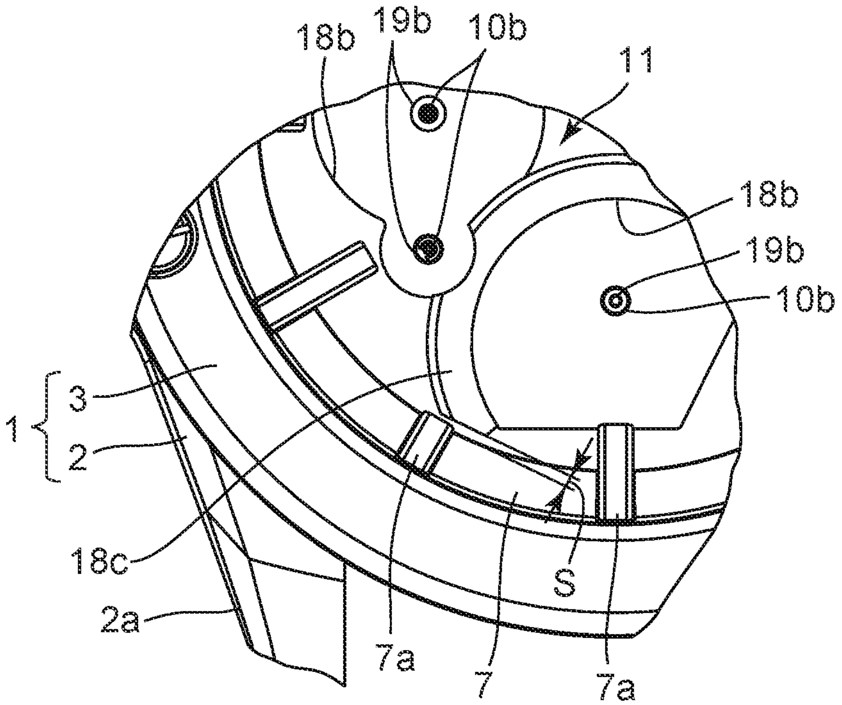
FIG. 7 is an enlarged view of a main portion of the wristwatch shown in FIG. 1.

As shown in FIG. 1 to FIG. 3, this wristwatch is equipped with a wristwatch case 1 which includes a body case 2 made of metal such as stainless steel and an exterior case 3 that is also made of metal such as stainless steel.

The body case 2 has a substantially cylindrical shape. On outer circumferential portions of the body case 2 on the 12 o'clock side and the 6 o'clock side, band attachment sections 2*a* are integrally formed, as shown in FIG. 1 to FIG. 3. The exterior case 3 has a cylindrical shape whose size is substantially the same as that of the body case 2, and is integrally formed by being fixed to the upper part of the body case 2 by welding such as laser welding or brazing.

To the upper opening of the wristwatch case 1, that is, to the opening of the exterior case 3, a watch glass 4 is attached via a glass packing 4*a*. Also, to the bottom of the wristwatch case 1, that is, to the bottom of the body case 2, a back cover 5 is attached via a waterproof ring 5*a*.

On the 2 o'clock side, 3 o'clock side, 4 o'clock side of the wristwatch case 1, or more specifically, on the 2 o'clock side, 3 o'clock side, and 4 o'clock side of the body case 2, switches 6 are respectively provided, as shown in FIG. 1 and FIG. 2. In this embodiment, switches 6 on the 2 o'clock side and 4 o'clock side of the body case 2 are push button switches, and a switch 6 on the 3 o'clock side of the body case 2 is a switch device such as a winder.

That is, each switch 6 on the 2 o'clock side and 4 o'clock side of the body case 2, which is a pushbutton switch, includes an operation shaft 6*a* and a head section 6*b*, and has a structure where these components have been slidably provided in a pipe section 6*c* fixed in a through hole 2*c* of the body case 2, as shown in FIG. 2. In this embodiment, the inner end of the operation shaft 6*a* protrudes into the body case 2 and the outer end thereof protrudes into the large diameter hole of the pipe section 6*c* with the operation shaft 6*a* being arranged in the small diameter hole of the pipe section 6*c*.

The head section 6*b* is arranged to be retractable in the large diameter hole of the pipe section 6*c* provided around an outer end portion of the operation shaft 6*a*, as shown in FIG. 2. As a result, each of the two switches 6 is structured such that, when its head section 6*b* is pushed from outside the body case 2, the inner end of its operation shaft 6*a* is pushed into the body case 2, and the inner end of the pushed operation shaft 6*a* pushes a contact section (not shown) of a timepiece module 8 described later so that the contact section performs a switch operation.

Inside the wristwatch case 1, a partition member 7 and the timepiece module 8 are provided, as shown in FIG. 1 to FIG. 3. The partition member 7 is formed in a ring shape, and attached to the inner circumferential surface of the exterior case 3 with it being arranged under the watch glass 4. On the upper surface of this partition member 7, a plurality of hour characters 7*a* are provided at equal intervals along its circumferential direction.

The timepiece module 8 includes a module body 10 and a dial 11, and has a substantially disc shape as a whole, as shown in FIG. 1 to FIG. 4C. This timepiece module 8 is structured to be inserted into the body case 2 from the back surface side (lower surface side) and arranged in the body case 2 by a middle frame 9. In this embodiment, the middle frame 9 is a ring-shaped member made of synthetic resin, and is structured to be arranged between the inner circumferential surface of the body case 2 and the outer circumferential surface of the module body 10 of the timepiece module 8 so as to fix the timepiece module 8 in the body case 2.

The module body 10 includes a substantially disk-shaped base member 12, as shown in FIG. 2 to FIG. 5C. On the front surface side (upper surface side) of this base member 12, a solar panel 13 is provided. Also, to the back surface side (lower surface side) of this base member 12, a circuit board 14 is attached by a hold down plate 15, and a battery 16 is attached by an electrode plate 17. Moreover, although not shown, this base member 12 is provided with a plurality of clock movements for moving pointers and a plurality of sub-pointers, and a display section for displaying information such as a date and a day of the week.

In this embodiment, in the center of the module body 10, a pointer shaft 10*a* for moving the pointers by one of the plurality of timepiece movements is provided protruding from the front surface side (upper surface side) of the module body 10 through a shaft insertion hole 13*a* of the solar panel 13, as shown in FIG. 4A, FIG. 4B, FIG. 4C, FIG. 5A, FIG. 5B and FIG. 5C.

In addition, in an area between the 12 o'clock side of the module body 10 and the pointer shaft 10*a*, an area between the 6 o'clock side and the pointer shaft 10*a*, and an area between the 9 o'clock side and the pointer shaft 10*a*, a plurality of sub-pointer shafts 10*b* for moving the plurality of sub-pointers by the plurality of timepiece movements is provided protruding from the front surface side of the module body 10 through a plurality of shaft insertion holes 13*b* of the solar panel 13, as shown in FIG. 4A, FIG. 4B, FIG. 4C, FIG. 5A, FIG. 5B and FIG. 5C. Moreover, on the 4 o'clock side of the module body 10, or more specifically, on the 4 o'clock side of the solar panel 13, a rectangular display window section 13*c* is provided corresponding to the display section (not shown) provided on the 4 o'clock side of the module body 10.

On the other hand, the dial 11, which is formed by a highly decorative metal plate 18 such as aluminum and a light transmissive resin sheet 19 being laminated, is structured to be attached to the front surface (upper surface) of the module body 10, as shown in FIG. 2 to FIG. 4A, FIG. 4B, FIG. 6A and FIG. 6B. The metal plate 18 is formed in a substantially disc shape whose outer diameter is slightly smaller than that of the module body 10, and the resin sheet 19 is formed in a substantially disc shape whose outer diameter is equal to that of the metal plate 18.

In this embodiment, in the center of the resin sheet 19, a main shaft hole 19*a* into which the pointer shaft 10*a* of the module body 10 is inserted is provided corresponding to the shaft insertion hole 13*a* of the solar panel 13, as shown in FIG. 4A, FIG. 4B, FIG. 4C, FIG. 6A and FIG. 6B. In an area between the 12 o'clock side of the resin sheet 19 and the main shaft hole 19*a*, an area between the 6 o'clock side and the main shaft hole 19*a*, and an area between the 9 o'clock side and the main shaft hole 19*a*, sub-pointer shaft holes 19*b* into which the sub-pointer shafts 10*b* of the module body 10 are inserted are provided corresponding to the plurality of shaft insertion holes 13*b* of the solar panel 13.

Also, on the 4 o'clock side of the resin sheet 19, a display window section 19*c* is provided corresponding to the display window section 13*c* of the solar panel 13 which corresponds to the display section of the module body 10, as shown in FIG. 4A, FIG. 4B, FIG. 4C, FIG. 6A and FIG. 6B. On outer circumferential portions of this resin sheet 19, a plurality of positioning projections 19*d* for positioning the module body 10 is provided.

In the center of the metal plate 18 of the dial 11, a main shaft hole 18*a* into which the pointer shaft 10*a* of the module body 10 is inserted is provided corresponding to the main shaft hole 19*a* of the resin sheet 19, as shown in FIG. 4A, FIG. 4B, FIG. 4C, FIG. 6A and FIG. 6B. Also, in an area between the 12 o'clock side of the metal plate 18 and the main shaft hole 19*a*, an area between the 6 o'clock side and the main shaft hole 19*a*, and an area between the 9 o'clock side and the main shaft hole 19*a*, a plurality of pointer movement opening sections 18*b* is provided in which the plurality of sub-pointers is moved by the plurality of timepiece movements.

In this embodiment, among the plurality of pointer movement opening sections 18*b*, pointer movement opening sections 18*b* on the 12 o'clock side and the 9 o'clock side are each formed in a substantially circular shape centering on a corresponding sub-pointer shaft 10*b* of the module body 10 and a corresponding sub-pointer shaft hole 19*b* of the resin sheet 19, as shown in FIG. 4A, FIG. 4B, FIG. 4C, FIG. 6A and FIG. 6B. Also, a pointer movement opening section 18*b* on the 6 o'clock side is formed in a substantially semicircular shape centering on the corresponding sub-pointer shaft 10*b* of the module body 10 and the corresponding sub-pointer shaft hole 19*b* of the resin sheet 19. Around the outer periphery of this pointer movement opening section 18*b*, a scale section 18*c* is provided in a semicircular shape and positioned one step higher than this pointer movement opening section 18*b*.

In this embodiment, portions of the resin sheet 19 corresponding to the plurality of pointer movement opening sections 18*b* are structured to allow light from the outside to pass through them and irradiate the solar panel 13 of the module body 10 so that the solar panel 13 generates electricity, as shown in FIG. 4A, FIG. 4B, FIG. 4C, FIG. 6A and FIG. 6B. Also, on the 4 o'clock side of the metal plate 18, a display window section 18*d* is provided corresponding to the display window section 13*c* of the solar panel 13 and the display window section 19*c* of the resin sheet 19 which correspond to the display section of the module body 10.

On outer circumferential portions of the dial 11, or more specifically, on outer circumferential portions of the metal plate 18, a plurality of projection pieces 20 are provided projecting outside the outer circumference of the module body 10, as shown in FIG. 4A, FIG. 4B, FIG. 4C, FIG. 6A and FIG. 6B. These projection pieces 20 are to restrict the position of the dial 11 with respect to the wristwatch case 1 in radial directions, and are provided in five areas, that is, an area on the 1 o'clock side, an area between the 2 o'clock side and the 3 o'clock side, an area on the 5 o'clock side, an area on the 8 o'clock side, and an area on the 10 o'clock side.

Among the plurality of projection pieces 20, two projection pieces 20 positioned on the 8 o'clock side and the 10 o'clock side are provided diagonally opposing the two switches 6 on the 2 o'clock side and the 4 o'clock side among the plurality of switches 6 provided on the wristwatch case 1, as shown in FIG. 1, FIG. 4A, FIG. 4B, FIG. 4C, FIG. 6A and FIG. 6B. In addition, among the plurality of projection pieces 20, three projection pieces 20 positioned on the 1 o'clock side, between the 2 o'clock side and the 3 o'clock side, and on the 5 o'clock side are provided not to diagonally oppose the switches 6 on the wristwatch case 1.

As a result, the dial 11 is structured such that the plurality of projection pieces 20 comes in contact with or close to inner circumferential portions of the wristwatch case 1, or more specifically, inner circumferential portions of the body case 2 with the dial 11 being mounted in the wristwatch case 1 together with the module body 10, and thereby restricts the position of the dial 11 with respect to the wristwatch case 1 in the radial directions, as shown in FIG. 2, FIG. 4A, FIG. 4B, FIG. 4C, FIG. 6A, FIG. 6B and FIG. 8.

In this embodiment, the dial 11 is structured such that, when one of the switches 6 is pushed from outside with the dial 11 and the module body 10 being mounted in the wristwatch case 1 and the middle frame 9 not being provided around the outer circumference of the module body 10, the projection pieces 20 on the 8 o'clock side and the 10 o'clock side come in contact with inner circumferential portions 100 of the wristwatch case 1 and thereby restricts the position of the dial 11 with respect to the wristwatch case 1 in the radial directions, as shown in FIG. 2, FIG. 4A, FIG. 4B, FIG. 4C, FIG. 6A, FIG. 6B and FIG. 8.

Also, each of the plurality of projection pieces 20 includes a mounting area 20*a* that is arranged on and overlaps with the front surface (upper surface) of the module body 10 and a projection area 20*b* that projects outside the outer circumference of the module body 10 (refer to FIG. 6A and FIG. 6B), and the resin sheet 19 is not arranged on the back surface (lower surface) of the mounting area 20*a* and the projection area 20*b*, as shown in FIG. 2, FIG. 4A, FIG. 4B, FIG. 4C, FIG. 6A and FIG. 6B. As a result, each projection piece 20 is structured to be arranged by the outer peripheral edge of its projection area 20*b* coming in contact with or close to the inner circumferential portions of the wristwatch case 1.

In this embodiment, in the inner circumferential portions of the wristwatch case 1, or more specifically, in the inner circumferential portions of the body case 2, a plurality of restriction recess areas 2*b* is provided with which the projection areas 20*b* of the plurality of projection pieces 20 are engaged from the back surface side (lower surface side) of the wristwatch case 1, as shown in FIG. 2, FIG. 4A, FIG. 4B, FIG. 4C, and FIG. 8. These restriction recess areas 2*b* are to restrict the position of the dial 11 with respect to the wristwatch case 1 in the radial directions, and are provided in five areas on the inner circumferential portions of the wristwatch case 1, that is, an area on the 1 o'clock side, an area between the 2 o'clock side and the 3 o'clock side, an area on the 5 o'clock side, an area on the 8 o'clock side, and an area on the 10 o'clock side, as with the plurality of projection pieces 20 of the dial 11.

The mounting areas 20*a* of two projection pieces 20 on the 5 o'clock side and the 10 o'clock side among the plurality of projection pieces 20, which are arranged overlapping with the module body 10, are provided with fixing pins 21, as shown in FIG. 4A, FIG. 4B, FIG. 4C, FIG. 6A and FIG. 6B. These two fixing pins 21 are structured to be pressed into two fixing holes 22 provided in outer circumferential rim portions of the module body 10 and thereby fix the dial 11 to the module body 10.

In this embodiment, the two fixing pins 21 are formed having a length equal to or slightly shorter than the vertical length (thickness) of the module body 10, as shown in FIG. 4A, FIG. 4B, FIG. 4C, FIG. 6A and FIG. 6B. Also, the two fixing holes 22 are provided in two areas on the 5 o'clock side and the 10 o'clock side on the outer circumferential rim of the base member 12 of the module body 10 with or without them penetrating through the front and back (upper and lower) surfaces of the base member 12, as shown in FIG. 4A, FIG. 4B, FIG. 4C, FIG. 5A, FIG. 5B and FIG. 5C.

Accordingly, when being arranged on the module body 10, the dial 11 is fixed on the module body 10 by the two fixing pins 21 on the mounting areas 20*a* of the two projection pieces 20 being pressed into the two fixing holes 22 of the module body 10, as shown in FIG. 3 to FIG. 6B.

The timepiece module 8 having the dial 11 fixed on the module body 10 has a structure where the dial 11 and the module body 10 can be detached by a disassembly jig 23, as shown in FIG. 9 to FIG. 13B. More specifically, the disassembly jig 23 includes a first jig 24 on which the front surface side of the timepiece module 8, that is, the front surface side (upper surface side) of the dial 11 is arranged, and a second jig 25 on which the back surface side of the timepiece module 8, that is, the back surface side (lower surface side) of the module body 10 is arranged.

The first jig 24 is formed in a cylindrical shape whose outer diameter is sufficiently larger than that of the timepiece module 8, as shown in FIG. 9 to FIG. 12C. In the center of one end surface of the first jig 24, or more specifically, in the center of the end surface of the first jig 24 opposing the second jig 25, an arrangement recess section 24*a* is provided in which the dial 11 side of the timepiece module 8 is arranged.

The first jig 24 is structured such that its portions around the outer circumference of the arrangement recess section 24*a* are provided with a plurality of support areas 26 that supports outer circumferential portions of the module body 10 while avoiding portions corresponding to the plurality of projection pieces 20 of the dial 11, two restriction pins 27 that restrict the position of the timepiece module 8, and two guide pins 28 that guide the second jig 25 with respect to the first jig 24, as shown in FIG. 9 to FIG. 12C.

The plurality of support areas 26 is provided on portions of the first jig 24 which are around the outer circumference of the arrangement recess section 24*a* and do not correspond to the plurality of projection pieces 20 of the dial 11, as shown in FIG. 9 to FIG. 12C. More specifically, the plurality of support areas 26 is structured to be provided on five portions of the first jig 24 around the outer circumference of the arrangement recess section 24*a*, that is, a portion between the 1 o'clock side and the 2 o'clock side, a portion between the 3 o'clock side and the 5 o'clock side, a portion between the 6 o'clock side and the 7 o'clock side, a portion between the 8 o'clock side and the 10 o'clock side, and a portion between the 11 o'clock side and the 12 o'clock side, and support the outer circumferential portions of the module body 10 without coming in contact with the dial 11.

Also, on portions of the first jig 24 around the outer circumference of the arrangement recess section 24*a*, a plurality of first relief recess sections 29 is provided to be positioned alternately with the support areas 26, as shown in FIG. 9 to FIG. 12C. More specifically, the plurality of first relief recess sections 29 is provided on five portions of the first jig 24 around the outer circumference of the arrangement recess section 24*a*, that is, a portion between the 12 o'clock side and the 1 o'clock side, a portion between the 2 o'clock side and the 3 o'clock side, a portion between the 5 o'clock side and the 6 o'clock side, a portion between the 7 o'clock side and the 8 o'clock side, and a portion between the 10 o'clock side and the 11 o'clock side.

In this embodiment, the lengths (depth and height) of the arrangement recess section 24*a*, the plurality of support areas 26, and the plurality of first relief recess sections 29 in their respective axial directions are formed to be slightly longer than the sum of the vertical length of the dial 11, that is, the thickness of the metal plate 18 of the dial 11 and the length of one fixing pin 21, as shown in FIG. 9 to FIG. 12C. As a result, the dial 11 is structured such that the plurality of projection pieces 20 and the fixing pins 21 are arranged without coming in contact with the plurality of first relief recess sections 29.

On two first relief recess sections 29 on the 12 o'clock side and the 6 o'clock side among the plurality of first relief recess sections 29, the restriction pins 27 are provided, as shown in FIG. 9 to FIG. 12C. The lengths (heights) of these two restriction pins 27 are formed to be slightly longer than the sum of the length (thickness) of the module body 10 in its front-back direction and the axial length (depth) of one first relief recess section 29.

In this embodiment, in outer circumferential portions of the module body 10, that is, outer circumferential portions of the base member 12, restriction grooves 30 in which the two restriction pins 27 of the first jig 24 are arranged to restrict the position of the timepiece module 8 by the first jig 24 are provided avoiding the projection pieces 20 of the dial 11 and the outer circumference thereof, as shown in FIG. 9 to FIG. 11B.

More specifically, the two restriction grooves 30 of the module body 10 are grooves each having a semicircular cross section, and are provided in two portions of the module body 10 on the 12 o'clock side and the 6 o'clock side in a manner not to overlap with the dial 11, as shown in FIG. 4A to FIG. 5C and FIG. 9 to FIG. 11B. As a result, when the timepiece module 8 is to be arranged in the first jig 24, the two restriction pins 27 of the first jig 24 are inserted into the restriction grooves 30 of the module body 10 from the front surface side (upper surface side) of the timepiece module 8 while avoiding the dial 11, whereby the position of the timepiece module 8 is restricted by the first jig 24.

Also, the two guide pins 28 of the first jig 24 are provided on two support areas 26 on the 4 o'clock side and the 9 o'clock side around the outer circumference of the arrangement recess section 24*a* of the first jig 24, as shown in FIG. 9 to FIG. 13B. These two guide pins 28 are structured to be slidably inserted into two guide holes 31 provided in the second jig 25 and thereby guide the sliding movement of the second jig 25 in a direction approaching or moving away from the first jig 24.

The second jig 25 is formed in a cylindrical shape having the same size as the first jig 24, as shown in FIG. 9 to FIG. 11B, FIG. 13A and FIG. 13B. In the center of one end surface of the second jig 25, or more specifically, in the center of the end surface of the second jig 25 opposing the first jig 24, an arrangement hole section 25*a* is provided in which the back surface side (lower surface side) of the module body 10 of the timepiece module 8 is arranged.

The second jig 25 is structured such that, in its portions around the outer circumference of the arrangement hole section 25*a*, a plurality of hold down areas 32 is provided in addition to the above-described two guide holes 31, which press toward the first jig 24 the projection areas 20*b* of the plurality of projection pieces 20 of the dial 11 projecting outside the outer circumference of the module body 10, and thereby separate the dial 11 from the module body 10, as shown in FIG. 9 to FIG. 11B, FIG. 13A and FIG. 13B.

These hold down areas 32 are provided avoiding the plurality of support areas 26 of the first jig 24, on the portions of the second jig 25 which are around the outer circumference of the arrangement hole section 25*a* and correspond to the plurality of projection pieces 20 of the dial 11, or in other words, the plurality of first relief recess sections 29 of the first jig 24, as shown in FIG. 9 to FIG. 11B, FIG. 13A and FIG. 13B.

That is, these hold down areas 32 have sizes equal to or slightly smaller than those of the first relief recess sections 29 of the first jig 24 and are provided on the portions of the second jig 25 around the outer circumference of the arrangement hole section 25*a* in a manner to substantially coincide with the first relief recess sections 29, as shown in FIG. 9 to FIG. 11B, FIG. 13A and FIG. 13B. More specifically, these hold down areas 32 are provided on five portions of the second jig 25 around the outer circumference of the arrangement hole section 25*a*, that is, a portion between the 12 o'clock side and the 1 o'clock side, a portion between the 2 o'clock side and the 3 o'clock side, a portion between the 5 o'clock side and the 6 o'clock side, a portion between the 7 o'clock side and the 8 o'clock side, and a portion between the 10 o'clock side and the 11 o'clock side.

In this embodiment, on portions of the second jig 25 around the outer circumference of the arrangement hole section 25*a*, a plurality of second relief recess sections 33 is provided to be positioned alternately with the plurality of hold down areas 32 and to correspond to the plurality of support areas 26 of the first jig 24, as shown in FIG. 9 to FIG. 11B, FIG. 13A and FIG. 13B. More specifically, these second relief recess sections 33 are provided on five portions of the second jig 25 around the outer circumference of the arrangement hole section 25*a*, that is, a portion between the 1 o'clock side and the 2 o'clock side, a portion between the 3 o'clock side and the 5 o'clock side, a portion between the 6 o'clock side and the 7 o'clock side, a portion between the 8 o'clock side and the 10 o'clock side, and a portion between the 11 o'clock side and the 12 o'clock side.

In two second relief recess sections 33 on the 4 o'clock side and the 9 o'clock side among the plurality of second relief recess sections 33, the guide holes 31 are provided into which the two guide pins 28 of the first jig 24 are inserted, as shown in FIG. 9 to FIG. 13B. In this embodiment, the lengths of the arrangement hole section 25*a*, the plurality of hold down areas 32, and the plurality of second relief recess sections 33 in their respective axial directions are formed to be longer than the lengths of the arrangement recess section 24*a* of the first jig 24, the plurality of support areas 26, and the plurality of first relief recess sections 29 in their respective axial directions.

As a result, the disassembly jig 23 is structured such that, when the timepiece module 8 where the dial 11 has been attached to the module body 10 is to be arranged in the arrangement recess section 24*a* of the first jig 24, the two restriction pins 27 are inserted into the restriction grooves 30 of the module body 10 with the dial 11 being oriented toward the bottom surface side of the arrangement recess section 24*a*, whereby the timepiece module 8 is arranged in the first jig 24 with its position being restricted, as shown in FIG. 9 to FIG. 13B.

That is, the disassembly jig 23 is structured such that, when the position of the timepiece module 8 is restricted by the first jig 24, the projection areas 20*b* of the plurality of projection pieces 20 of the dial 11 correspond to the plurality of first relief recess sections 29, and the plurality of support areas 26 supports the outer circumferential portions of the module body 10 while avoiding the dial 11, as shown in FIG. 9 to FIG. 13B.

Also, the disassembly jig 23 is structured such that, when the second jig 25 is to be pressed against the first jig 24, the two guide pins 28 of the first jig 24 are inserted into the two guide holes 31 of the second jig 25, whereby the first jig 24 and the second jig 25 approach each other while being guided by each other, as shown in FIG. 9 to FIG. 13B Moreover, the disassembly jig 23 is structured such that, when the first jig 24 and the second jig 25 approach each other and the plurality of hold down areas 32 of the second jig 25 are pressed against the projection areas 20*b* of the plurality of projection pieces 20 of the dial 11, the plurality of hold down areas 32 presses the projection areas 20*b* of the plurality of projection pieces 20 of the dial 11 into the plurality of first relief recess sections 29 of the first jig 24 with the outer circumferential portions of the module body 10 being supported by the plurality of support areas 26 of the first jig 24, as shown in FIG. 9 to FIG. 13B.

As a result, the disassembly jig 23 is structured such that, when the plurality of hold down areas 32 presses the projection areas 20*b* of the plurality of projection pieces 20 of the dial 11 into the plurality of first relief recess sections 29 of the first jig 24, the plurality of support areas 26 of the first jig 24 is pressed into the plurality of second relief recess sections 33 of the second jig 25, whereby the fixing pins 21 of the dial 11 are pulled out from the fixing holes 22 of the module body 10, and the dial 11 is separated from the module body 10, as shown in FIG. 9 to FIG. 13B.

Next, the assembly of this wristwatch is described.

In the assembly of this wristwatch, first, the clock module 8 is assembled. Here, the dial 11 is arranged corresponding to the front surface side (upper surface side) of the module body 10, and the two fixing pins 21 provided on the mounting areas 20*a* of the two projection pieces 20 positioned between the 5 o'clock side and the 6 o'clock side and on the 10 o'clock side among the plurality of projection pieces 20 provided on the outer circumference portions of the dial 11 are pressed and inserted into the two fixing holes 22 provided in the outer circumferential rim portions of the module body 10.

Here, merely by the mounting areas 20*a* of the two projection pieces 20 having the two fixing pins 21 among the plurality of projection pieces 20 being pressed toward the front surface (upper surface) of the module body 10, the two fixing pins 21 of the dial 11 can be pressed into the two fixing holes 22 of the module body 10. That is, the assembling work can be easily performed, and the dial 11 can be favorably fixed to the module body 10 without damaging the front surface (upper surface) of the dial 11.

In this state, the projection areas 20*b* of the plurality of projection pieces 20 of the dial 11 are respectively projecting outside the outer circumference of the module body 10. In addition, in this state, the outer circumferential part of the module body 10 is projecting and being exposed outside the outer circumference of the dial 11 excluding its portions corresponding to the plurality of projection pieces 20.

Accordingly, the two restriction grooves 30 provided in the outer circumferential portions of the module body 10 are being exposed outside the outer circumference of the dial 11. Next, the pointers (not shown) are attached to the pointer shaft 10*a* of the module body 10, and the sub-pointers (not shown) are attached to the plurality of sub-pointer shafts 10*b*. As a result, the timepiece module 8 is assembled.

Then, the timepiece module 8 is mounted on the wristwatch case 1. Here, the wrist case 1 is assembled in advance by the exterior case 3 being integrally fixed to the upper part of the body case 2 by welding such as laser welding or brazing. In the exterior case 3 of this wristwatch case 1, the partition member 7 is arranged. In addition, the watch glass 4 is fitted into and fixed to the upper opening of the exterior case 3 together with the glass packing 4*a*.

Figure 8:
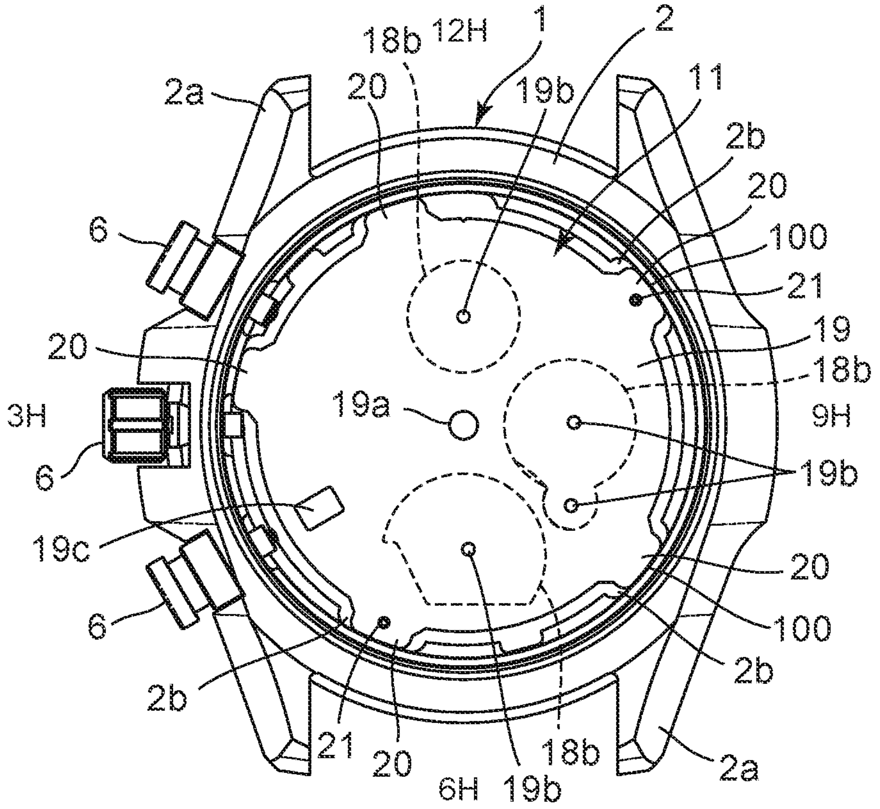
FIG. 8 is an enlarged back view of a wristwatch case shown in FIG. 1, in which the dial of the timepiece module has been arranged.
Figure 9:
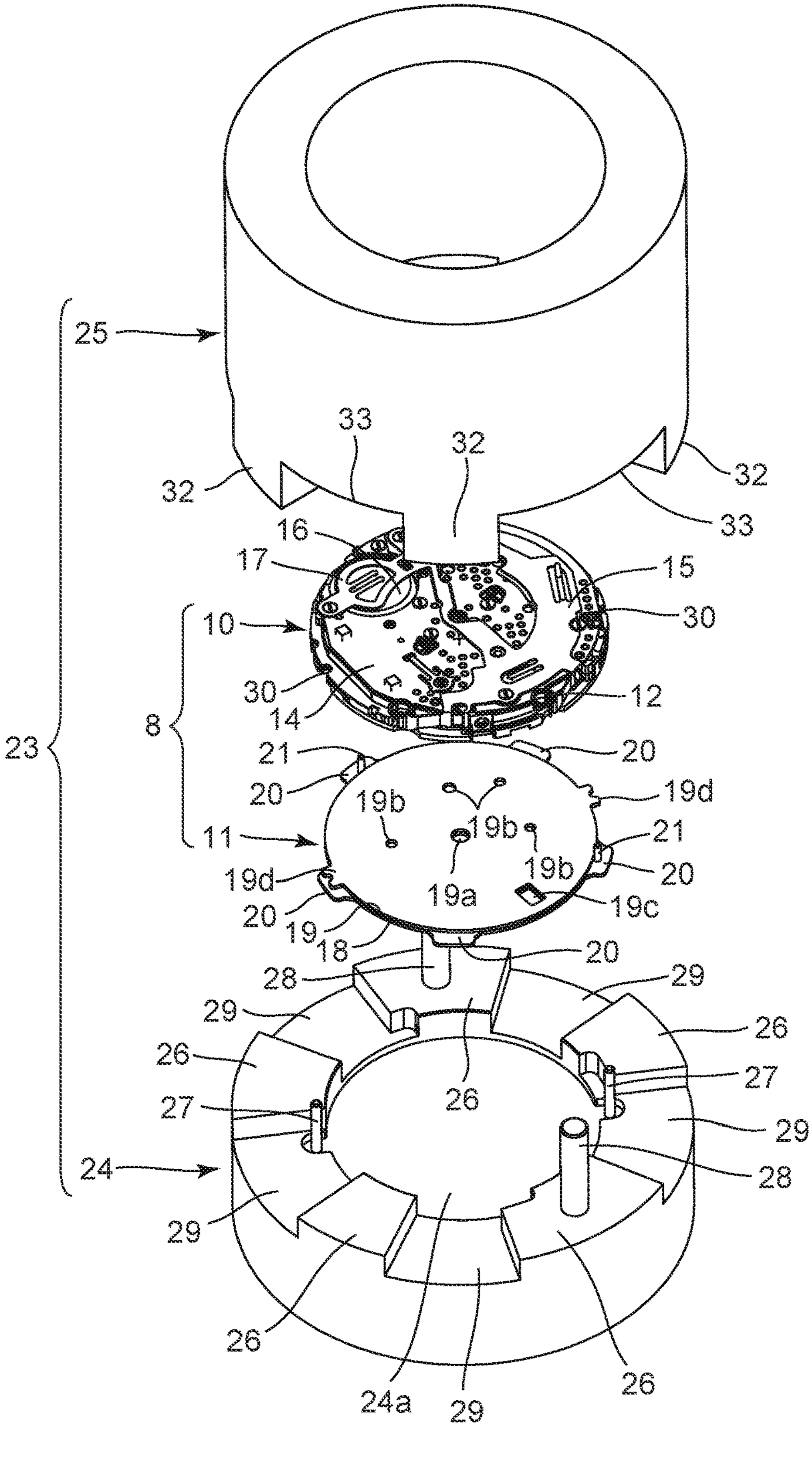
FIG. 9 is an exploded perspective view showing a disassembly jig for disassembling the timepiece module shown in FIG. 4A, FIG. 4B and FIG. 4C when viewed from diagonally above.
Figure 10:
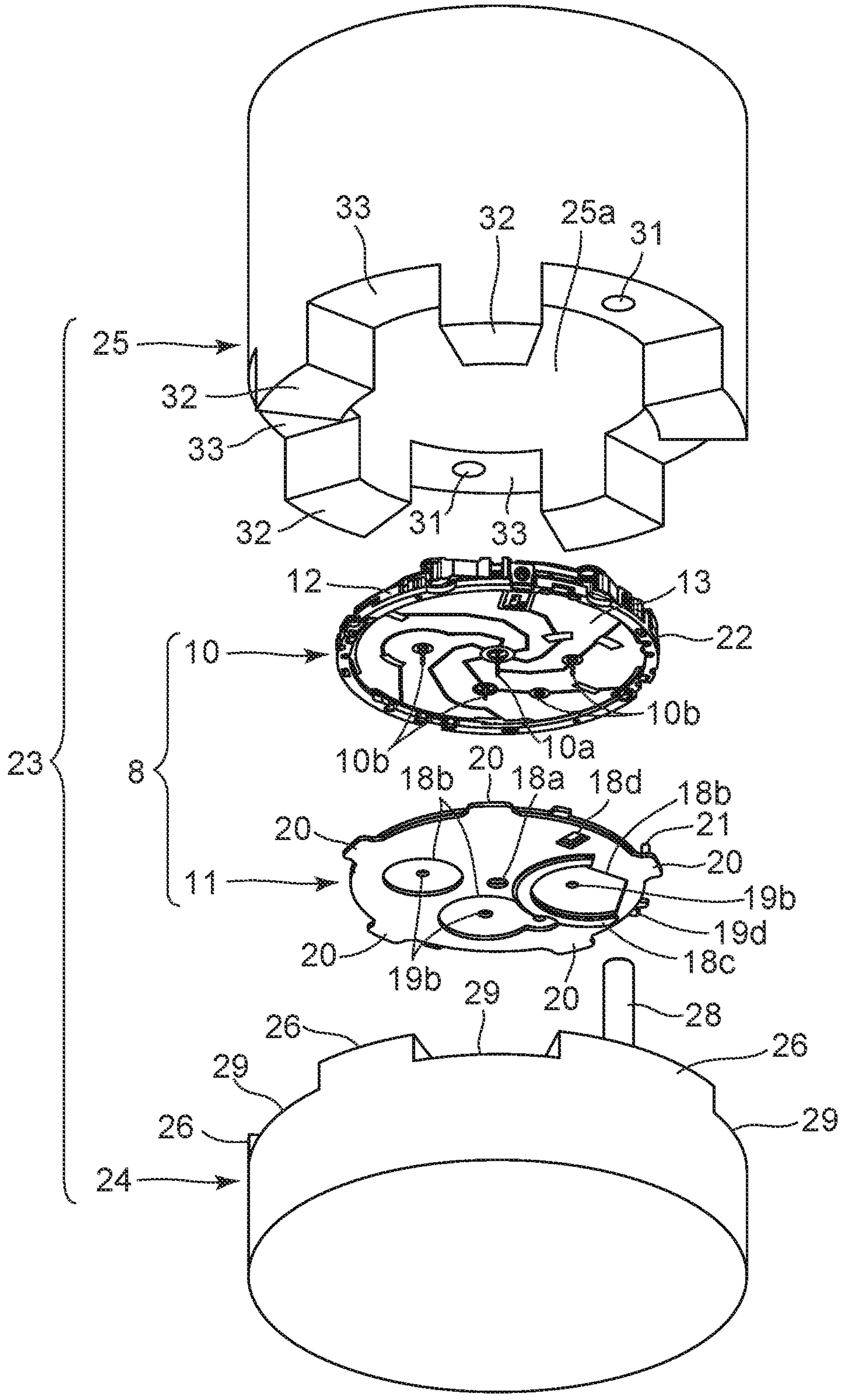
FIG. 10 is an exploded perspective view showing the disassembly jig for disassembling the timepiece module shown in FIG. 4A, FIG. 4B and FIG. 4C when viewed from diagonally below.
Figure 11A:
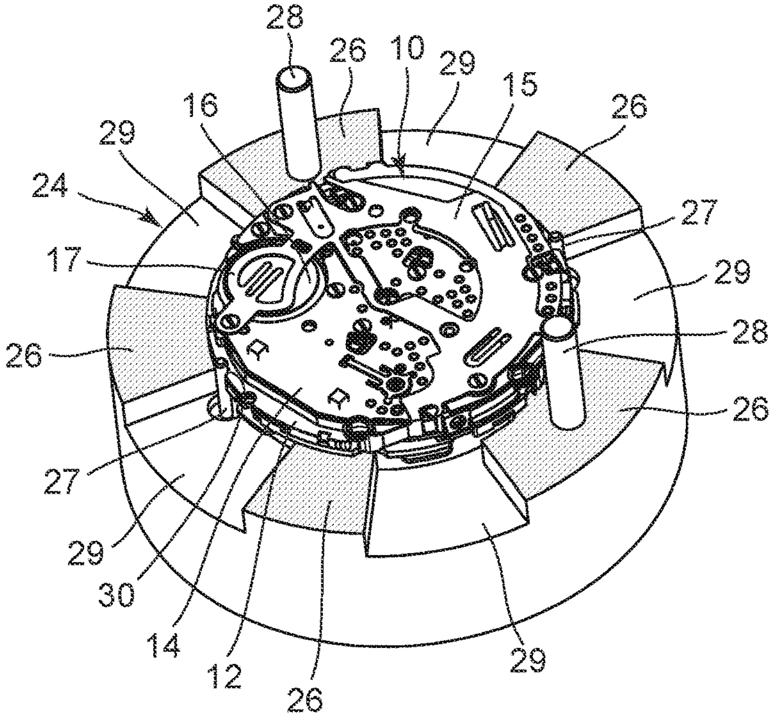
FIG. 11A is an enlarged perspective view showing the disassembly jig in FIG. 9, in which the timepiece module has been arranged in a first jig.
Figure 11B:
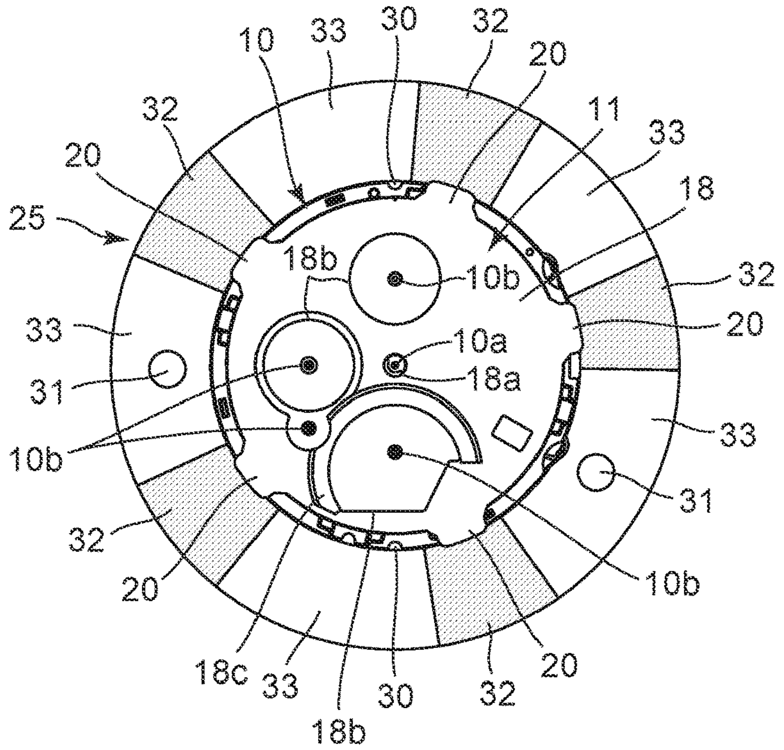
FIG. 11B is an enlarged bottom view showing the disassembly jig in FIG. 9, in which a second jig is pressing the timepiece module toward the first jig.
Figure 12A:
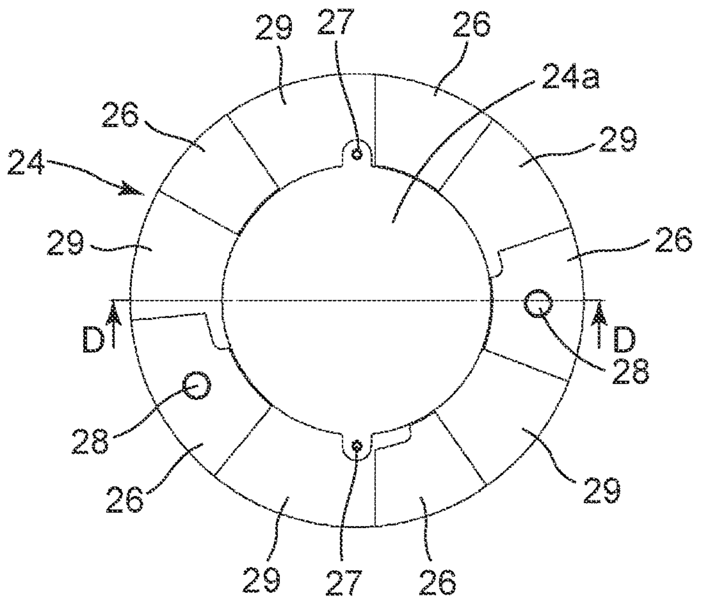
FIG. 12A is an enlarged front view of the first jig shown in FIG. 9.
Figure 12B:
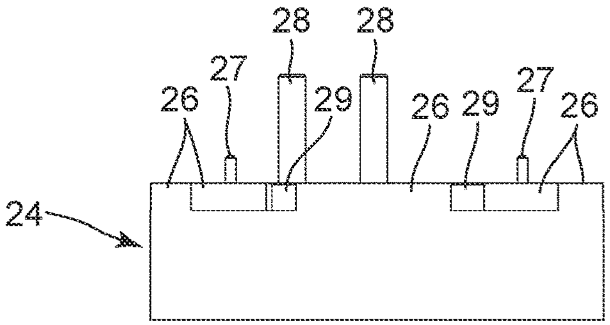
FIG. 12B is an enlarged side view of the first jig shown in FIG. 9.
Figure 12C:
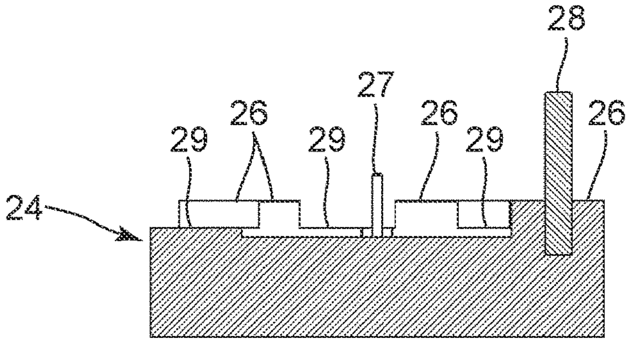
FIG. 12C is an enlarged sectional view of the first jig taken along line D-D in FIG. 12A.
Figure 13A:
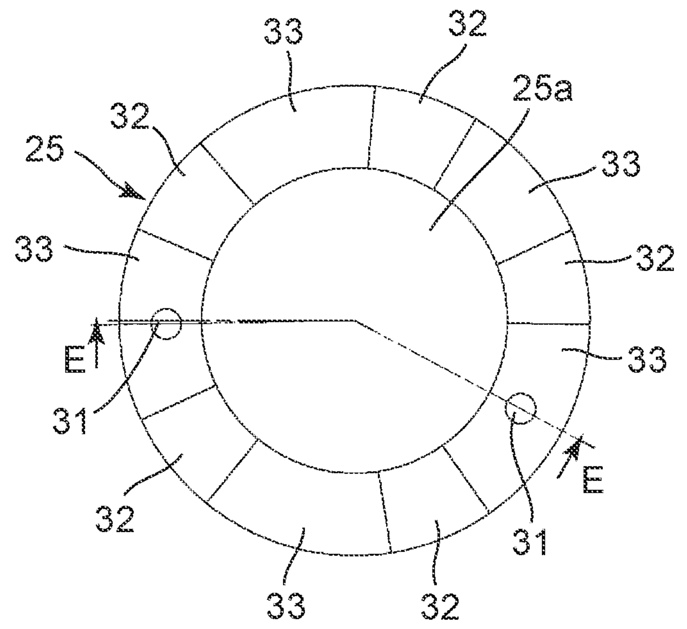
FIG. 13A is an enlarged front view of the second jig shown in FIG. 9.
Figure 13B:
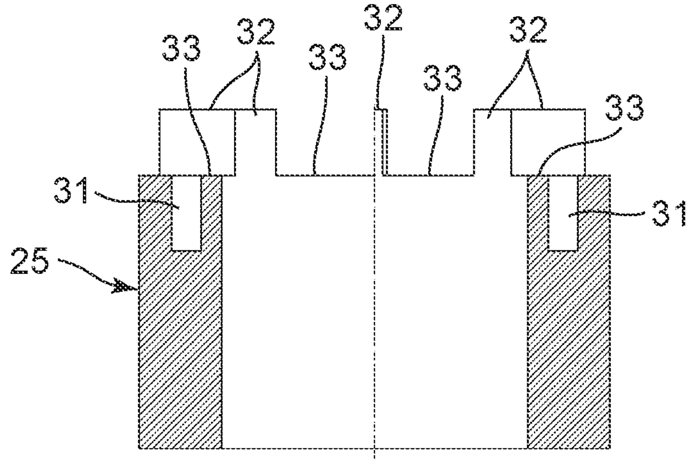
FIG. 13B is an enlarged sectional view of the second jig taken along line E-E in FIG. 13A.

In this state, the timepiece module 8 is inserted into the body case 2 of the wristwatch case 1 from the back surface side (lower surface side). Here, the plurality of projection pieces 20 of the dial 11 are positioned corresponding to and engaged with the plurality of restriction recess areas 2*b* provided in the inner circumferential portions of the body case 2, as shown in FIG. 8. Accordingly, the outer ends of the projection areas 20*b* of the plurality of projection pieces 20 are arranged in contact with or near the inner circumferential surface of the body case 2, in the plurality of restriction recess areas 2*b*.

As a result, the dial 11 is arranged in the body case 2 without slipping in the radial directions relative to the body case 2, and accordingly the module body 10 is arranged in the body case 2 without slipping in the radial directions relative to the body case 2. Here, an end portion of the scale section 18*c* provided one step higher and positioned around the outer periphery of the pointer movement opening section 18*b* on the 6 o'clock side among the plurality of pointer movement opening sections 18*b* in the metal plate 18 of the dial 11 is arranged with a space S between it and the inner circumferential surface of the partition member 7 (refer to FIG. 7).

Also, by both sides of each projection area 20*b* of the plurality of projection pieces 20 being arranged in contact with or close to both side surfaces in the corresponding one of the plurality of restriction recess areas 2*b*, the position of the dial 11 with respect to the wristwatch case 1 in the radial directions is restricted, and accordingly the position of the module body 10 with respect to the wristwatch case 1 in the radial directions is also restricted. Next, the switches 6 are attached to the 2 o'clock side, 3 o'clock side, and 4 o'clock side of the wristwatch case 1.

Here, even when the timepiece module 8 is pressed by the operation shafts 6*a* of the switches 6 by the switches 6 being mounted on the 2 o'clock side and 4 o'clock side of the wristwatch case 1, since the projection areas 20*b* of the projection pieces 20 of the dial 11 positioned diagonally to these switches 6 come in contact with the inner circumferential surface of the body case 2, the timepiece module 8 does not slip in the wristwatch case 1 even though the middle frame 9 is not yet around the outer circumference of the module body 10.

Similarly, when the switch 6 is to be mounted on the 3 o'clock side of the wristwatch case 1, since the projection sections 20*b* of the projection pieces 20 of the dial 11 positioned diagonally to the switches 6 on the 2 o'clock side and 4 o'clock side of the wristwatch case 1 come in contact with the inner circumferential surface of the body case 2, the timepiece module 8 does not slip in the wristwatch case 1 even though the middle frame 9 is not yet around the outer circumference of the module body 10.

Accordingly, when the plurality of switches 6 are to be mounted on the wristwatch case 1, the scale section 18*c* provided one step higher and positioned around the outer periphery of the pointer movement opening section 18*b* on the 6 o'clock side among the plurality of pointer movement opening sections 18*b* on the metal plate 18 of the dial 11 does not come in contact with the inner circumferential surface of the partition member 7, and thereby is prevented from being damaged. As a result, the plurality of switches 6 is favorably mounted on the wristwatch case 1.

In this state, the outer circumferential surface of the module body 10 of the timepiece module 8 arranged in the wristwatch case 1 and the inner circumferential surface of the body case 2 have a space therebetween. Therefore, the middle frame 9 is arranged in this space between the outer circumferential surface of the module body 10 and the inner circumferential surface of the body case 2, whereby the timepiece module 8 is fixed in the body case 2. Then, the back cover 5 is attached to the bottom portion of the body case 2 together with the waterproof ring 5*a*. As a result, the wristwatch is assembled.

Next, the disassembly of the timepiece module 8 is described.

First, the timepiece module 8 is taken out from the inside of the wristwatch case 1. Here, the back cover 5 is detached from the bottom portion of the body case 2 of the wristwatch case 1, and then the plurality of switches 6 is dismounted from the body case 2 of the wristwatch case 1.

In this state, the timepiece module 8 is taken out from the wristwatch case 1 together with the middle frame 9, and the middle frame 9 is detached from the module body 10. Then, the pointers (not shown) are detached from the pointer shaft 10*a* of the module body 10, and the sub-pointers (not shown) are detached from the plurality of sub-pointer shafts 10*b*.

Then, the timepiece module 8 is disassembled by the disassembly jig 23. In this assembly, first, the timepiece module 8 is placed in the arrangement recess section 24*a* of the first jig 24 of the disassembly jig 23. Here, the two restriction pins 27 are inserted into the restriction grooves 30 provided in the outer circumferential portions of the module body 10 with the dial 11 being oriented toward the bottom surface side of the arrangement recess section 24*a*. As a result, the timepiece module 8 is arranged in the first jig 24 while being positionally restricted.

When the position of the timepiece module 8 is restricted as described above by the first jig 24, the plurality of support areas 26 of the first jig 24 supports the outer circumferential portions of the module body 10 while avoiding the dial 11 with the projection areas 20*b* of the plurality of projection pieces 20 of the dial 11, which are projecting outside the outer circumference of the module body 10, being positioned corresponding to the plurality of first relief recess sections 29 of the first jig 24.

In this state, the second jig 25 is pressed against the first jig 24. Here, the two guide pins 28 of the first jig 24 are inserted into the two guide holes 31 of the second jig 25, whereby the first jig 24 and the second jig 25 are brought close to each other while being guided by each other.

Then, the plurality of hold down areas 32 of the second jig 25 is pressed against the projection areas 20*b* of the plurality of projection pieces 20 of the dial 11. Here, the plurality of support areas 26 of the first jig 24 supports the outer circumferential portions of the module body 10 while avoiding the dial 11 with the projection areas 20*b* of the plurality of projection pieces 20 of the dial 11 corresponding to the plurality of first relief recess sections 29 of the first jig 24. In this state, the plurality of support areas 26 of the first jig 24 is corresponding to the plurality of second relief recess sections 33 of the second jig 25, and the plurality of hold down areas 32 of the second jig 25 is corresponding to the plurality of first relief recess sections 29 of the first jig 24.

Accordingly, when pressed against the projection areas 20*b* of the plurality of projection pieces 20 of the dial 11, the plurality of hold down areas 32 of the second jig 25 presses the projection areas 20*b* of the plurality of projection pieces 20 of the dial 11 into the plurality of first relief recess sections 29 of the first jig 24, and the plurality of support areas 26 of the first jig 24 is pressed into the plurality of second relief recess sections 33 of the second jig 25. As a result, the fixing pins 21 of the dial 11 are pulled out from the fixing holes 22 of the module body 10, by which the dial 11 is easily separated from the module body 10.

As described above, the timepiece module 8 of this wristwatch includes the module body 10 having the fixing holes 22 provided in the outer circumferential rim portions of its one surface, or more specifically, its front surface, and the dial 11 arranged on the front surface side of the module body 10. This dial 11 has the projection pieces 20 provided on its outer circumference portions and projecting outside the outer circumference of the module body 10, and the fixing pins 21 which are inserted into the fixing holes 22 of the module body 10 are provided on these projection pieces 20. As a result, by use of the projection pieces 20, the dial 11 can be easily detached from the module body 10.

That is, in this clock module 8, the dial 11 is firmly fixed to the module body 10 by the fixing pins 21 of the dial 11 being pressed into the fixing holes 22 of the module body 10. However, since the projection pieces 20 are provided on the outer circumferential portions of the dial 11 with them projecting outside the outer circumference of the module body 10, the dial 11 can be easily detached from the module body 10 without being damaged.

Also, in this clock module 8, each projection piece 20 includes the mounting area 20*a* that is arranged on the front surface of the module body 10 and the projection area 20*b* that projects outside the outer circumference of the module body 10, and the fixing pins 21 are provided on the mounting areas 20*a* of the two projection pieces 20. Accordingly, when the dial 11 is to be attached to the module body 10, the fixing pins 21 provided on the mounting areas 20*a* of these projection pieces 20 are reliably and favorably pressed into the fixing holes 22 provided in the outer circumferential rim portions of the module body 10, whereby the dial 11 can be firmly fixed to the module body 10.

Here, in this timepiece module 8, the fixing pins 21 of the dial 11 can be pressed into the fixing holes 22 of the module body 10 simply by the mounting areas 20*a* of the projection pieces 20 having the fixing pins 21 being pressed toward the front surface (upper surface) of the module body 10. Therefore, the assembling work can be easily performed, and the dial 11 can be favorably fixed to the module body 10 without damaging the front surface (upper surface) of the dial 11.

Moreover, in this clock module 8, the projection pieces 20 are provided on the plural portions on the outer circumference of the dial 11, and the fixing pins 21 are provided on at least two of the plurality of projection pieces 20. Therefore, when the dial 11 is attached to the module body 10, the position of the dial 11 with respect to the module body 10 in the radial directions and the circumferential directions can be accurately and reliably restricted by these two fixing pins 21 provided on the two projection pieces 20.

Furthermore, in this clock module 8, the module body 10 and the dial 11 are separated from each other by the disassembly jig 23 including the first jig 24 where the dial 11 side on the front surface of the module body 10 is arranged and the second jig 25 where the back surface side of the module body 10 opposite to this front surface is arranged. As a result of this structure, the dial 11 can be easily detached from the module body 10.

That is, the first jig 24 for this clock module 8 includes the support areas 26 that support the outer circumferential portions of the module body 10 while avoiding the portions corresponding to the projection pieces 20 of the dial 11, and the restriction pins 27 that restricts the position of the module body 10. As a result, by the support areas 26, the module body 10 can be reliably and favorably supported by the first jig 24 without the dial 11 coming in contact with the first jig 24. Also, by the restriction pins 27, the module body 10 can be accurately positioned on the first jig 24 together with the dial 11.

Here, in this clock module 8, the restriction grooves 30, in which the restriction pins 27 of the first jig 24 are arranged to restrict the position of the module body 10, are provided in the outer circumferential portions of the module body 10 while avoiding portions corresponding to the dial 11. As a result of this structure, the restriction pins 27 can accurately and reliably restrict the position of the module body 10 on the first jig 24 without coming in contact or overlapping with the dial 11.

Also, in the center of the end surface of the first jig 24 opposing the second jig 25, the arrangement recess section 24*a* is provided in which the timepiece module 8 is arranged, and the plurality of support areas 26 and the plurality of first relief recess sections 29 are alternately provided around the outer circumference of this arrangement recess section 24*a*. As a result, when the clock module 8 is to be arranged in the arrangement recess section 24*a*, the projection areas 20*b* of the plurality of projection pieces 20 of the dial 11 can be arranged corresponding to the plurality of first relief recess sections 29, and the module body 10 can be reliably and favorably supported by the plurality of support areas 26 without the dial 11 coming in contact with the first jig 24.

Also, the second jig 25 for this clock module 8 includes the hold down areas 32 that separate the dial 11 from the module body 10 by pressing the projection areas 20*b* of the projection pieces 20 of the dial 11, which project outside the outer circumference of the module body 10, toward the first jig 24 side while avoiding the support areas 26 of the first jig 24. Accordingly, when the timepiece module 8 is held between the first jig 24 and the second jig 25, the projection areas 20*b* of the projection pieces 20 of the dial 11 are reliably pressed toward the first jig 24 side by the hold down areas 32 of the second jig 25, whereby the dial 11 can be easily separated from the module body 10.

Here, in the center of the end surface of the second jig 25 opposing the first jig 24, the arrangement hole section 25*a* is provided in which the timepiece module 8 is arranged, and the plurality of hold down areas 32 and the plurality of second relief recess sections 33 are alternately provided around the outer circumference of this arrangement hole section 25*a*. As a result, when the clock module 8 is arranged in the arrangement hole section 25*a*, it is possible to press only the projection areas 20*b* of the projection pieces 20 of the dial 11 against the plurality of first relief recess sections 29 of the first jig 24 by the hold down areas 32, whereby the fixing pins 21 of the dial 11 can be pulled out from the fixing holes 22 of the module body 10, and consequently the dial 11 can be reliably and favorably separated from the module body 10.

Here, in the disassembly jig 23, the two guide pins 28 are provided on the first jig 24 and the two guide holes 31 into which the two guide pins 28 are slidably inserted are provided in the second jig 25. Accordingly, by the two guide pins 28 and the two guide holes 31, the first jig 24 and the second jig 25 can be accurately and favorably slid and moved in directions away from each other.

Also, this wristwatch includes the wristwatch case 1 having the switches 6 provided on its outer circumferential portions, and the dial 11 arranged in the wristwatch case 1, and this dial 11 has the projections pieces 20 which project from its outer circumferential portions opposing the switches 6 and come in contact with the inner circumferential portions 100 of the wristwatch case 1, whereby the slippage of the dial 11 in the radial directions can be prevented.

That is, in this wristwatch, the projection pieces 20 provided projecting from the outer circumferential portions of the dial 11 are opposed to the switches 6 provided on the wristwatch case 1. Accordingly, when the switches 6 are pressed from outside, the projection sections 20 come in contact with the inner circumferential portions 100 of the wristwatch case 1. As a result of this structure, the slippage of the dial 11 in the radial directions can be prevented even when the middle frame 9 has not been provided around the outer circumference of the module body 10.

Also, in this wristwatch, the restriction recess areas 2*b* which engage with the projection pieces 20 of the dial 11 and restrict the position of the dial 11 in the radial directions are provided in the inner circumferential portions of the wristwatch case 1. Accordingly, when the dial 11 is arranged in the wristwatch case 1, the projection pieces 20 of the dial 11 engage with the restriction recess areas 2*b* provided in the inner circumferential portions of the wristwatch case 1, whereby the slippage of the dial 11 with respect to the wristwatch case 1 in the radial directions can be prevented.

Moreover, in this wristwatch, the dial 11 is arranged on the front surface (upper surface) of the module body 10 that is housed in the wristwatch case 1, and the projection pieces 20 project outside the outer circumference of the module body 10. Accordingly, by these projection pieces 20 provided on the dial 11, the module body 10 can be positioned in the wristwatch case 1 without coming in contact with the inner circumferential surface of the wristwatch case 1, and thereby prevented from being damaged even when the wristwatch case 1 receives an impact.

Here, the projection pieces 20 of the dial 11 project outside the outer circumference of the module body 10. Accordingly, even when the fixing pins 21 of the dial 11 are pressed into the fixing holes 22 of the module body 10 and the dial 11 is firmly fixed to the module body 10 thereby, the dial 11 can be easily detached from the module body 10 without being damaged, by use of the projection pieces 20 of the dial 11 projecting outside the outer circumference of the module body 10.

Furthermore, in this wristwatch, the switches 6 are provided on the plural portions of the wristwatch case 1, and the projection pieces 20 are provided diagonally opposing at least the two switches 6 among the plurality of switches 6. Therefore, the projection areas 20*b* of the projection pieces 20 of the dial 11 positioned diagonally to these two switches 6 can be brought into contact with the inner circumferential surface of the body case 2, whereby the timepiece module 8 is reliably prevented from slipping in the wristwatch case 1.

That is, in this wristwatch, the switches 6 are provided on the three portions of the wristwatch case 1 on the 2 o'clock side, the 3 o'clock side, and the 4 o'clock side, and the projection pieces 20 are provided diagonally opposing at least the switches 6 on the 2 o'clock side and the 4 o'clock side among the plurality of switches 6. Therefore, even if these two switches 6 are pressed from outside and thereby press the clock module 8, since the projection areas 20*b* of the projection pieces 20 of the dial 11 positioned diagonally to these two switches 6 come in contact with the inner circumferential surface of the body case 2, the timepiece module 8 is reliably prevented from slipping in the wristwatch case 1 even when the middle frame 9 has not been provided around the outer circumference of the module body 10.

Here, in this wristwatch, even if the switch 6 provided on the 3 o'clock side of the wristwatch case 1 is pressed from outside, since the projection areas 20*b* of the projection pieces 20 of the dial 11 positioned diagonally to the switches 6 on the 2 o'clock side and the 4 o'clock side come in contact with the inner circumference surface of the body case 2, the timepiece module 8 is reliably prevented from slipping in the wristwatch case 1 even when the middle frame 9 has not been provided around the outer circumference of the module body 10.

Accordingly, in this wristwatch, although the scale section 18*c* that is formed one step higher is provided around the outer periphery of the pointer movement opening section 18*b* on the 6 o'clock side among the plurality of pointer movement opening sections 18*b* provided in the dial 11, this scale section 18*c* is prevented from being damaged since it does not come in contact with the inner circumference surface of the partition member 7, whereby the timepiece module 8 can be favorably mounted in the wristwatch case 1.

In this wristwatch, the projection pieces 20 are also provided on the portions not opposing the plurality of switches 6 in addition to the portions opposing them. Accordingly, even if a portion of the dial 11 not corresponding to the switches 6 is pressed, since the projection pieces 20 provided on the portions not opposing the plurality of switches 6 come in contact with the inner circumferential surface of the wristwatch case 1, the dial 11 is reliably and favorably prevented from slipping in the wristwatch case 1 even when the middle frame 9 has not been provided around the outer circumference of the module body 10, whereby the timepiece module 8 can be stably arranged in the wristwatch case 1.

Also, in this wristwatch, the dial 11 is mounted in the wristwatch case 1 from the back surface side of the wristwatch case 1 which is located on the back surface (lower surface) side of the module body 10. As a result of this structure, the dial 11 can be easily and favorably mounted in the wristwatch case 1 together with the module body 10, which improves the assembling work for the timepiece module 8.

Note that, in the above-described embodiment, the plurality of projection pieces 20 provided on the outer circumferential portions of the dial 11 is formed having the same circumferential length. However, the present invention is not limited thereto. For example, a structure such as that of a first modification example shown in FIG. 14A and FIG. 14B may be adopted in which the plurality of projection pieces 20 and 35 are formed having different circumferential lengths.

Figure 14A:
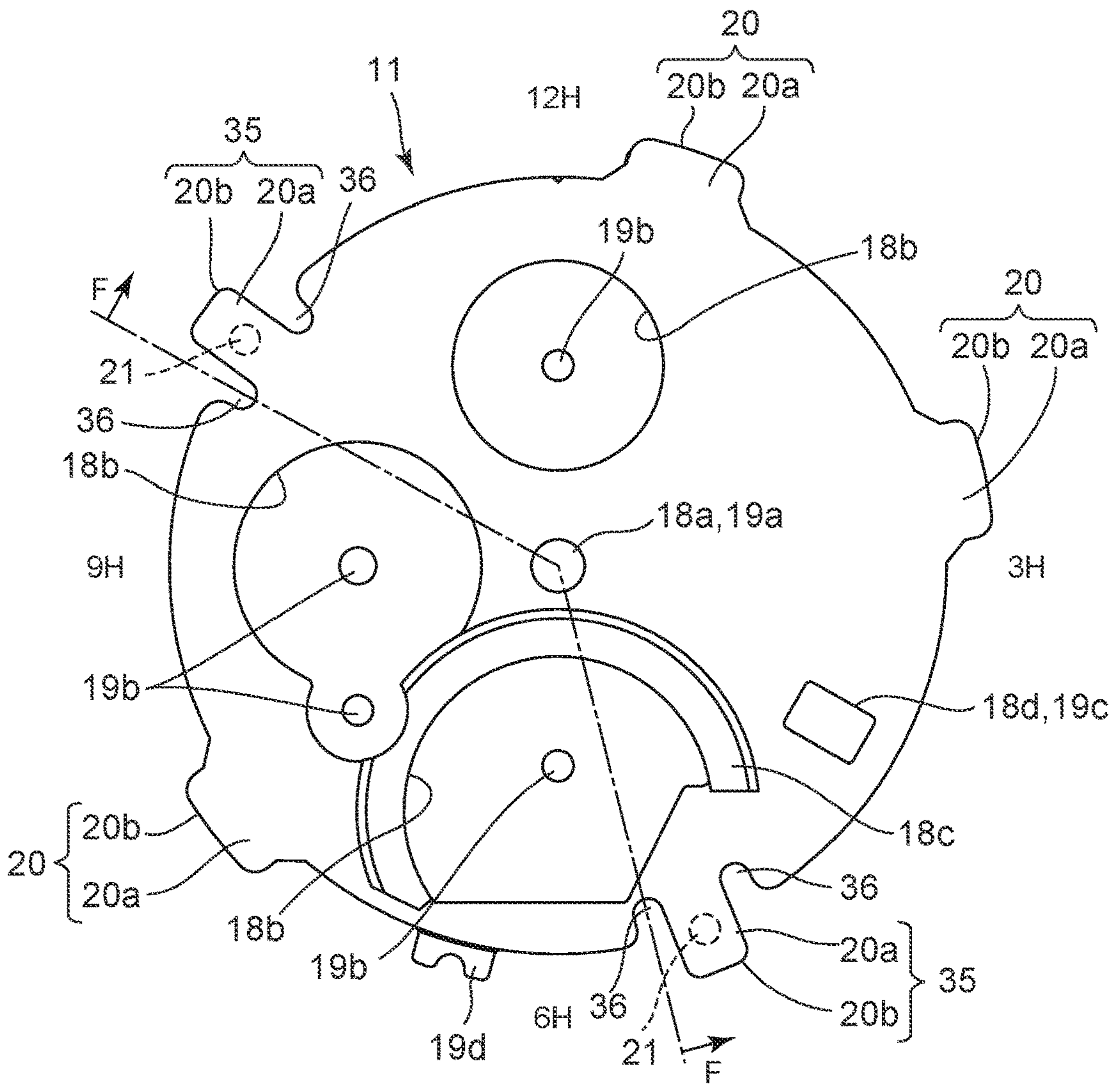
FIG. 14A is an enlarged front view of a first modification example of the dial shown in FIG. 6A and FIG. 6B.

More specifically, in the first modification example of the dial 11, the two projection pieces 35 (first projection pieces) having the fixing pins 21 among the plurality of projection pieces 20 and 35 are formed such that their lengths in a circumferential direction of the dial 11 are shorter than those of the other projection pieces 20 (second projection pieces) not having fixing pins 21, as shown in FIG. 14A. As a result, the two projection pieces 35 provided with the fixing pins 21 are flexurally deformed more easily than the other projection pieces 20 not having fixing pins 21.

Figure 14B:
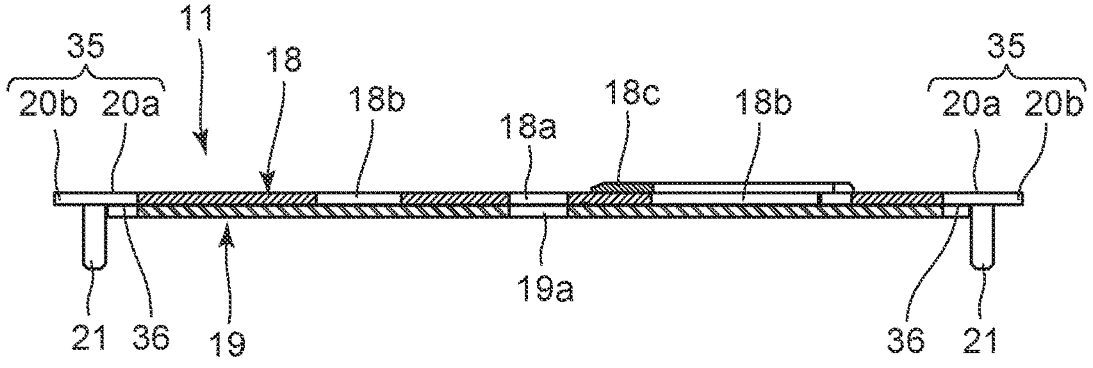
FIG. 14B is an enlarged sectional view of the first modification example taken along line F-F in FIG. 14A.

In this structure, in portions of the dial 11 on both sides of the base of each projection piece 35 provided with the fixing pin 21, cutout sections 36 recessed toward the center of the dial 11 are provided, as shown in FIG. 14A and FIG. 14B. These cutout sections 36 are provided in the metal plate 18 and the resin sheet 19 of the dial 11 so that, by the lengths of the two projection pieces 35 with the fixing pins 21 in radial directions of the dial 11 being formed longer than those of the other projection pieces 20 not having fixing pins 21, these two projection pieces 35 are flexurally deformed easily.

As a result, among the lengths of the plurality of projection pieces 20 and 35, the lengths of the two projection pieces 35 with the fixing pins 21 in the circumferential direction of the dial 11 are shorter than those of the other projection pieces 20 not having fixing pins 21, and the lengths of the two projection pieces 35 with the fixing pins 21 in the radial directions of the dial 11 are, by the existence of the cutout sections 36, longer than those of the other projection pieces 20 not having fixing pins 21, whereby the two projection pieces 35 having the fixing pins 21 are flexurally deformed more easily than the other projection pieces 20 not having fixing pins 21, and the fixing pins 21 are easily pulled out from the fixing holes 22 of the module body 10.

Also, since the two projection pieces 35 having the fixing pins 21 among the plurality of projection pieces 20 and 35 of the dial 11 are flexurally deformed easily, the fixing pins 21 can be easily pressed and fitted into the fixing holes 22 of the module body 10 even if there are small errors in the positions of the fixing pins 21 and the fixing holes 22.

Moreover, although the structure has been described in which the cutout sections 36 are provided as shown in FIG. 14A and FIG. 14B, a structure may be adopted in which the lengths of the two projection pieces 35 with the fixing pins 21 in the circumferential direction of the dial 11 are formed to be shorter than those of the other projection pieces 20 not having fixing pins 21 but the cutout sections 36 are not provided. Alternatively, a structure may be adopted in which the cutout sections 36 are provided but the lengths of the two projection pieces 35 with the fixing pins 21 in the circumferential direction of the dial 11 are formed to be equal to those of the other projection pieces 20 not having fixing pins 21.

Figure 15:
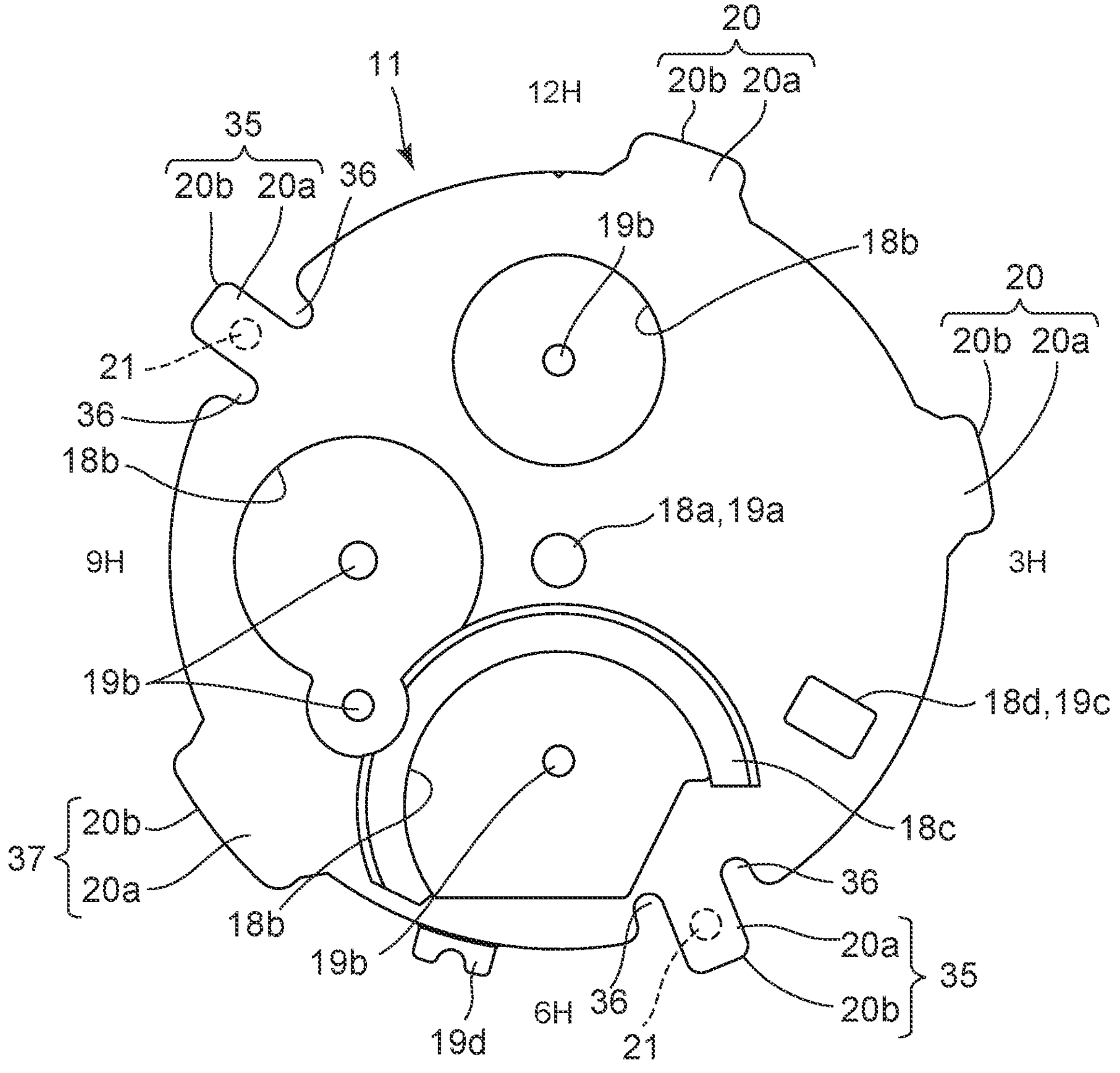
FIG. 15 is an enlarged front view of a second modification example of the dial shown in FIG. 14A.

In a second modification example of the dial 11, among the plurality of projection pieces 20, 35, and 37, the projection piece 37 (third projection piece) on the 8 o'clock side which opposes one of the switches 6 is formed such that its length in the circumferential direction of the dial 11 is longer than those of the other projection pieces 20 and 35, as shown in FIG. 15.

As a result, the impact resistance of the projection piece 37 opposing the switch 6 when it comes in contact with the inner circumferential surface of the wristwatch case 1 is higher than those of the other projection pieces 20 and 35. Also, a structure may be adopted in which the projection piece 35 on the 10 o'clock side in FIG. 15 which opposes one of the switches 6 is also formed such that its length in the circumferential direction of the dial 11 is longer than those of the other projection pieces 20 and 35, as with the above-described projection piece 37. In this structure, instead of the projection piece 20 on the 1 o'clock side, the projection piece 35 having the fixing pin 21 may be provided on the 1 o'clock side.

In the above-described embodiment, the fixing pins 21 are provided on the two projection pieces 20 among the plurality of projection pieces 20 on the outer circumferential portions of the dial 11. However, the present invention is not limited thereto. For example, a structure may be adopted in which fixing pins 21 are provided on all of the plurality of projection pieces 20. In this structure, a plurality of fixing holes 22 into which all of these fixing pins 21 are pressed and fitted may be provided in outer circumferential rim portions of the module body 10.

Also, in the above-described embodiment, the fixing pins 21 are provided on the projection pieces 20. However, the fixing pins 21 may be provided on areas near the projection pieces 20. For example, a structure may be adopted in which a fixing pin 21 is provided on a circumferential portion of the dial 11 located closer to the projection piece 20 on the 10 o'clock side than a middle point between the projection piece 20 on the 10 o'clock side and the 9 o'clock side that is a side between the projection piece 20 on the 10 o'clock side and the projection piece 20 on the 8 o'clock side. Also, a structure may be adopted in which a fixing pin 21 is provided closer to the center of the dial 11 than the projection piece 20 on the 10 o'clock side.

Moreover, in the above-described embodiment, the switches 6 are provided on the 2 o'clock side, 3 o'clock side, and 4 o'clock side of the wristwatch case 1. However, the present invention is not limited thereto. For example, the switches 6 may be provided on the 8 o'clock side, the 9 o'clock side, and the 10 o'clock side. In this structure, the projection pieces 20 may be provided on respective portions of the dial 11 opposing the switches 6 on the 8 o'clock side, the 9 o'clock side, and the 10 o'clock side.

Furthermore, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock and a wall clock. Still further, the present invention is not necessarily required to be applied in timepieces, and can be widely applied in measuring instruments such as meters.

While the present invention has been described with reference to the preferred embodiments, it is intended that the invention be not limited by any of the details of the description therein but includes all the embodiments which fall within the scope of the appended claims.

What is claimed is:

1. A module comprising:

a dial including:

a projection piece projecting in a radial direction; and a pin projecting from the projection piece; and a module body having a fixing hole provided in an outer circumferential rim on one surface, wherein the dial is arranged on the one surface of the module body, wherein the projection piece is provided on an outer circumferential surface of the dial and projects outside an outer circumference of the module body, and wherein the pin is inserted into the fixing hole of the module body.

2. The module according to claim 1, wherein the projection piece comprises a mounting area which is arranged on the one surface of the module body and a projection area which projects outside the outer circumference of the module body, and wherein the pin is provided on the mounting area.

3. The module according to claim 1, wherein the projection piece is plurally provided on a plurality of outer circumferential surfaces of the dial, and wherein the pin is plurally provided on at least two projection pieces.

4. The module according to claim 1, wherein the projection piece is a first projection piece provided with the pin, wherein the dial further comprises a second projection piece not provided with the pin, and wherein the first projection piece is formed such that a length thereof in a circumferential direction of the dial is shorter than a length of the second projection piece in the circumferential direction of the dial.

5. The module according to claim 1, wherein the module body and the dial are separated from each other by a jig comprising a first jig on which the dial side located on the one surface of the module body is arranged and a second jig on which an other surface side opposite to the one surface of the module body is arranged.

6. The module according to claim 5, wherein the first jig comprises a support area which supports an outer circumferential surface of the module body while avoiding a part corresponding to the projection piece of the dial, and a restriction pin which restricts a position of the module body.

7. The module according to claim 6, wherein a restriction groove in which the restriction pin of the first jig is arranged to restrict the position of the module body is provided in an outer circumferential surface of the module body while avoiding a part corresponding to the dial.

8. The module according to claim 6, wherein the second jig comprises a hold down area which separates the dial from the module body by pressing toward the first jig side a projection area of the projection piece of the dial projecting outside the outer circumference of the module body while avoiding the support area of the first jig.

9. The module according to claim 1, which forms a timepiece.

10. An electronic device comprising:

a case having a switch provided on an outer circumferential surface; and a dial arranged in the case, the dial including:

a projection piece projecting in a radial direction; and a pin projecting from the projection piece; and a module body housed in the case and having a fixing hole provided in an outer circumferential rim on one surface, wherein the dial is arranged on the one surface of the module body, wherein the projection piece is provided on an outer circumferential surface of the dial and projects outside an outer circumference of the module body, wherein the pin is inserted into the fixing hole of the module body, and wherein the projection piece projects from the outer circumferential surface of the dial opposing the switch and comes in contact with an inner circumferential surface of the case.

11. The electronic device according to claim 10, wherein the inner circumferential surface of the case is provided with a restriction recess area with which the projection piece of the dial is engaged to restrict a position of the dial in a radial direction.

12. The electronic device according to claim 11, wherein the switch is plurally provided on plural parts of the case, and the projection piece is plurally provided on parts diagonally opposing at least two switches.

13. The electronic device according to claim 10, wherein the switch is plurally provided on plural parts of the case, and the projection piece is plurally provided on parts diagonally opposing at least two switches.

14. The electronic device according to claim 13, wherein the projection piece is also provided on a part other than the parts opposing the switches.

15. The electronic device according to claim 10, wherein the projection piece is a third projection piece provided on the part opposing the switch, wherein the dial further comprises an other projection piece provided on a part other than the part opposing the switch, and wherein the third projection piece is formed such that a length thereof in a circumferential direction of the dial is longer than a length of the other projection piece in the circumferential direction of the dial.

16. The electronic device according to claim 10, wherein the dial is mounted in the case from one surface side of the case which is located opposite to the one surface of the module body.

17. The electronic device according to claim 10, which forms a timepiece.

* * * * *